United States Patent
Yagi et al.

(10) Patent No.: US 6,981,360 B2
(45) Date of Patent: Jan. 3, 2006

(54) GAS TURBINE POWER GENERATOR HAVING HUMIDIFYING AND COOLING MEANS

(75) Inventors: Manabu Yagi, Tsuchiura (JP); Satoshi Dodo, Mito (JP); Kuniyoshi Tsubouchi, Mito (JP); Yasuaki Akatsu, Hitachi (JP); Hiroshi Arita, Mito (JP); Norio Yasugahira, Hanamaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/474,324

(22) PCT Filed: Apr. 9, 2001

(86) PCT No.: PCT/JP01/03044

§ 371 (c)(1),
(2), (4) Date: Feb. 12, 2004

(87) PCT Pub. No.: WO02/084091

PCT Pub. Date: Oct. 24, 2002

(65) Prior Publication Data

US 2004/0112037 A1   Jun. 17, 2004

(51) Int. Cl.
*F02C 7/08* (2006.01)
*F02G 1/00* (2006.01)
*F02G 3/00* (2006.01)

(52) U.S. Cl. ............... 60/39.5; 60/39.3; 60/39.511; 60/39.59

(58) Field of Classification Search ............. 60/39.3, 60/39.5, 39.511, 39.53, 39.55, 39.59, 728

See application file for complete search history.

(56) References Cited

U.S. PATENT DOCUMENTS

| | | | | |
|---|---|---|---|---|
| 4,248,039 A | * | 2/1981 | Cheng | 60/775 |
| 4,448,018 A | * | 5/1984 | Sayama et al. | 60/775 |
| 4,753,068 A | * | 6/1988 | El-Masri | 60/39.511 |
| 5,417,053 A | * | 5/1995 | Uji | 60/784 |
| 6,205,768 B1 | * | 3/2001 | Dibble et al. | 60/39.511 |
| 6,247,302 B1 | * | 6/2001 | Tsukamoto et al. | 60/39.511 |
| 6,269,626 B1 | * | 8/2001 | Kim | 60/39.182 |
| 6,351,935 B1 | * | 3/2002 | Bronicki et al. | 60/39.182 |
| 6,389,799 B1 | * | 5/2002 | Hatamiya et al. | 60/39.3 |
| 6,397,578 B2 | * | 6/2002 | Tsukamoto et al. | 60/39.511 |
| 6,530,210 B2 | * | 3/2003 | Horii et al. | 60/39.53 |
| 6,578,354 B2 | * | 6/2003 | Hatamiya et al. | 60/39.511 |
| 6,584,776 B2 | * | 7/2003 | Mittricker et al. | 60/775 |

(Continued)

FOREIGN PATENT DOCUMENTS

EP   0 889 212 A2   7/1999

(Continued)

Primary Examiner—William H. Rodriguez
(74) Attorney, Agent, or Firm—Mattingly, Stanger, Malur & Brundidge, P.C.

(57) ABSTRACT

An object of the present invention is to provide a gas turbine power generator capable of increasing the power generation efficiency in partial load operation and decreasing a variation in the number of rotations caused by a variation in power generation load. The gas turbine power generator comprises a compressor (2) for compressing air, a combustor (5) for burning the compressed air and fuel, a turbine (6) driven by combustion gas produced in the combustor and driving the compressor (2) and a generator (7), a regenerative heat exchanger (4) for exchanging heat between exhaust gas from the turbine and the compressed air led into the combustor, an intake air sprayer (1), and a humidifier (3). Intake air flown into the regenerative heat exchanger (4) is humidified and cooled by the intake air sprayer (1) and the humidifier (3).

13 Claims, 17 Drawing Sheets

U.S. PATENT DOCUMENTS

| | | | |
|---|---|---|---|
| 6,634,165 B2 * | 10/2003 | Tomlinson et al. | 60/39.3 |
| 6,718,750 B2 * | 4/2004 | Shibata et al. | 60/39.511 |
| 6,745,574 B1 * | 6/2004 | Dettmer | 60/784 |
| 6,763,662 B2 * | 7/2004 | Hendriks | 60/728 |
| 2001/0042381 A1 * | 11/2001 | Dodo et al. | 62/238.3 |
| 2002/0007624 A1 * | 1/2002 | Mittricker et al. | 60/39.02 |
| 2004/0103637 A1 * | 6/2004 | Maisotsenko et al. | 60/39.59 |

FOREIGN PATENT DOCUMENTS

| | | |
|---|---|---|
| EP | 0 959 235 A2 | 11/1999 |
| JP | 1-173431 U | 12/1989 |
| JP | 11-72029 A | 3/1999 |
| JP | 11-324710 A | 11/1999 |
| JP | 2000-54857 A | 2/2000 |

* cited by examiner

GAS TURBINE POWER GENERATOR HAVING HUMIDIFYING AND COOLING MEANS

TECHNICAL FIELD

The present invention relates to a gas turbine power generator, and more particularly to a gas turbine power generator suitable for the case of employing a regenerative heat exchanger in the power generator.

BACKGROUND ART

Recently, as an independent power plant with capacity of from several tens to several hundreds kilowatts, a gas turbine power generator has been studied which employs a gas turbine to operate a generator and which includes a regenerative heat exchanger. In such a gas turbine power generator, the number of rotations N and a fuel flow rate $M_F$ are adjusted to hold the number of rotations N at a minimum in the range satisfying a demanded load while referring to a turbine outlet temperature $T_{OT}$ and a regenerative heat exchanger outlet temperature $T_{RO}$, thereby holding the combustion temperature as high as possible and increasing the efficiency of power generation.

DISCLOSURE OF THE INVENTION

In the gas turbine power generator described above, however, when an air flow rate $M_A$ reduces with a decrease of the power generation output, a thermal drop in a turbine is reduced and the turbine outlet temperature $T_{OT}$ reaches a turbine outlet setting temperature $T_{OTT}$ prior to the regenerative heat exchanger outlet temperature $T_{RO}$. Hence, the regenerative heat exchanger outlet temperature $T_{RO}$ cannot be held at a sufficiently high value, thus resulting in a problem that the regenerative heat exchange amount cannot be ensured at a sufficient level and the efficiency of power generation under a partial load is reduced.

Also, when a load variation occurs frequently, the frequency of a variation in the number of rotations caused by the load variation is increased, and the operation of increasing and decreasing the number of rotations N is repeated until the turbine outlet temperature $T_{OT}$ will be equal to the turbine outlet setting temperature $T_{OTT}$ or the regenerative heat exchanger outlet temperature $T_{RO}$ will be equal to or higher than a regenerative-heat-exchanger outlet setting temperature $T_{ROT}$. This leads to another problem that high-cycle thermal fatigue caused by a variation in the number of rotations of the turbine is noticeable.

An object of the present invention is to provide a gas turbine power generator capable of increasing the power generation efficiency in partial load operation and decreasing a variation in the number of rotations caused by a variation in power generation load.

To achieve the above object, the present invention provides a gas turbine power generator comprising a compressor for compressing air; a combustor for burning the compressed air and fuel; a turbine driven by combustion gas produced in the combustor and driving the compressor and a generator; and a regenerative heat exchanger for exchanging heat between exhaust gas from the turbine and the compressed air led into the combustor, wherein the gas turbine power generator further comprises humidifying and cooling means for humidifying and cooling intake air flown into the regenerative heat exchanger. With that construction, by humidifying and cooling the intake air supplied to the combustor, it is possible to increase the power generation efficiency in partial load operation and to decrease a variation in the number of rotations caused by a variation in power generation load.

BEST MODE FOR CARRYING OUT THE INVENTION

The construction and operation of a gas turbine power generator according to a first embodiment of the present invention will be described below with reference to FIGS. 1 to 7.

Figure 1:
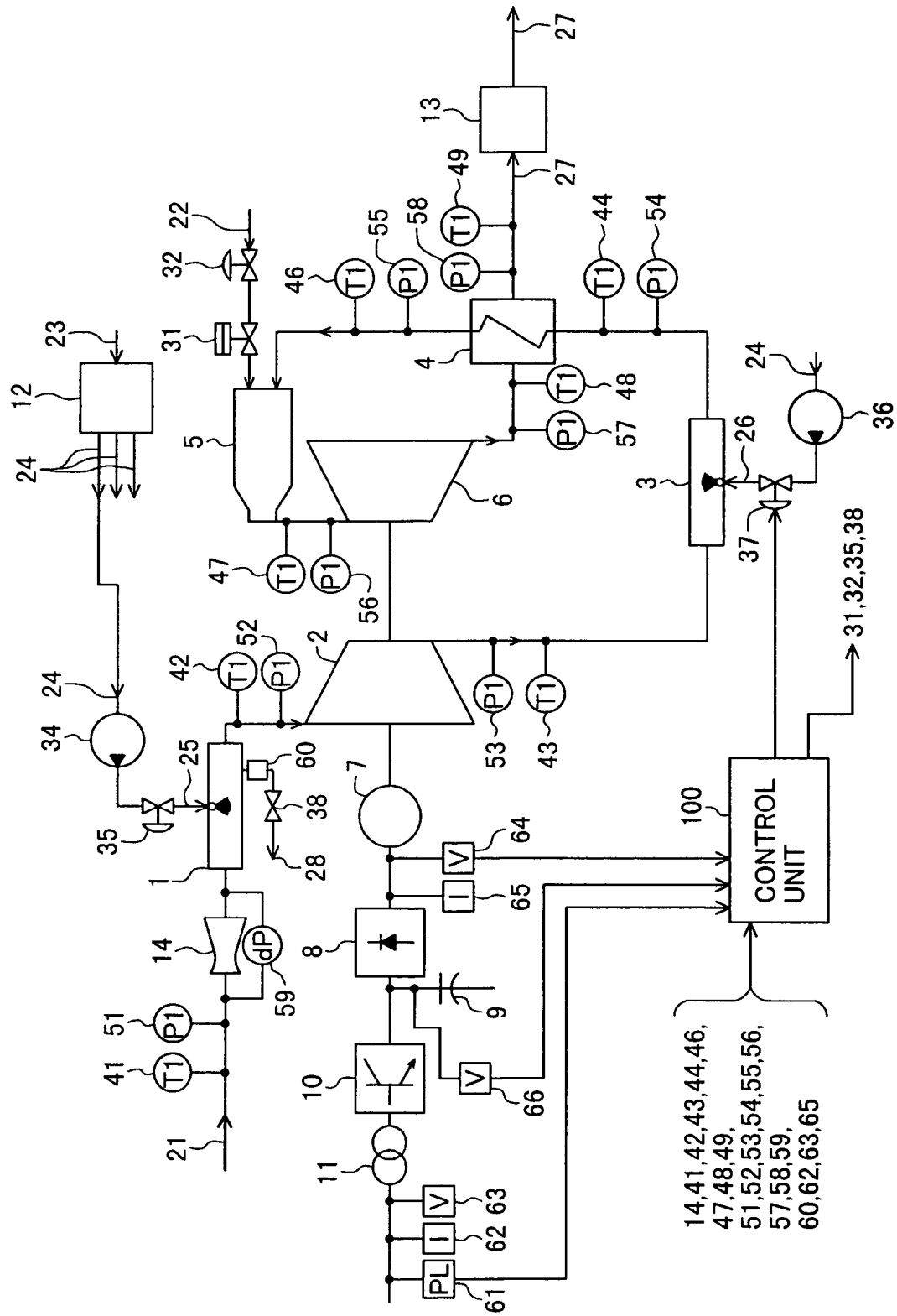
FIG. 1 is a system diagram showing an overall construction of a gas turbine power generator according to a first embodiment of the present invention.

A description is first made of overall construction of the gas turbine power generator according to this embodiment with reference to FIG. 1.

The gas turbine power generator according to this embodiment primarily comprises an intake air sprayer 1, a compressor 2, a humidifier 3, a regenerative heat exchanger 4, a combustor 5, a turbine 6, a generator 7, a rectifier 8, a capacitor 9, an inverter 10, an output transformer 11, a supply water treating unit 12, a waste heat recovering unit 13, and a control unit 100. The gas turbine power generator of this embodiment is particularly featured in including working fluid humidifying means, such as the intake air sprayer 1 and the humidifier 3, and associated accessory equipment, such as the supply water treating unit 12. The control unit 100 executes not only control executed in a known gas turbine power generator, but also control of the working fluid humidifying means, such as the intake air sprayer 1 and the humidifier 3.

The intake air sprayer 1 is disposed on the inlet side of the compressor 2 and is capable of humidifying and cooling sucked air 21 with a water spray depending on the ambient environment and the operation state. On the inlet side of the intake air sprayer 1, there are disposed an ambient air temperature means 41 for detecting an ambient air temperature around the sucked air 21, an atmosphere pressure measuring means 51 for detecting an atmosphere pressure around the sucked air 21, and a flow rate measuring means 14 for measuring a flow rate of the sucked air 21. A compressor inlet differential-pressure measuring means 59 disposed in association with the flow rate measuring means 14 measures a differential pressure at an inlet of the compressor. Values measured by the ambient air temperature measuring means 41, the atmosphere pressure measuring means 51, the flow rate measuring means 14, and the compressor inlet differential-pressure measuring means 59 are taken into the control unit 100.

The air 21 sucked into the inlet side of the compressor 2 is humidified and cooled by the intake air sprayer 1. Treated supply water 24 is supplied to the intake air sprayer 1 from the supply water treating unit 12. The supply water treating unit 12 carries out treatment of water 23 supplied to it, such as dust removal and softening. The treated supply water 24 is pressurized by an intake-air cooling water ejection pump 34, and its flow rate is adjusted by an intake-air cooling water flow adjusting valve 35. Then, the treated supply water 24 turns to intake-air spraying water 25 to humidify the sucked air 21 in the intake air sprayer 1. The intake-air cooling water flow adjusting valve 35 is controlled by the control unit 100. The amount of water 28 drained from the intake air sprayer 1 is measured by a drained-water flow measuring means 60 and discharged through a drained-water discharge valve 38.

The air humidified and cooled by the intake air sprayer 1 is compressed by the compressor 2 and introduced to the humidifier 3. On the inlet side of the compressor 2, there are disposed a compressor inlet temperature measuring means 42 for measuring an inlet temperature of the compressor and a compressor inlet pressure measuring means 52 for measuring an inlet pressure of the compressor. Also, on the delivery side of the compressor 2, there are disposed a compressor delivery temperature measuring means 43 for measuring a delivery temperature of the compressor and a compressor delivery pressure measuring means 53 for measuring a delivery pressure of the compressor. Values measured by the compressor inlet temperature measuring means 42, the compressor inlet pressure measuring means 52, the compressor delivery temperature measuring means 43, and the compressor delivery pressure measuring means 53 are taken into the control unit 100.

The humidifier 3 is able to humidify the intake air by ejecting a required amount of water, warm water or water vapor depending on the operation state, such as a power demand. The treated supply water 24 having been treated by the supply water treating unit 12 is pressurized by a humidifying water ejection pump 36 and its flow rate is adjusted by a humidifying water flow adjusting valve 37. Then, the treated supply water 24 turns to humidifying water 26 to humidify the intake air in the humidifier 3. The humidifying water flow adjusting valve 37 is controlled by the control unit 100.

The intake air having flown out of the humidifier 3 is preheated in the regenerative heat exchanger 4 by heat recovered from exhaust discharged from the turbine 6. On the inlet side of the regenerative heat exchanger 4, there are disposed an inlet temperature measuring means 44 for measuring an inlet temperature of the regenerative heat exchanger and a regenerative-heat-exchanger inlet pressure measuring means 54 for measuring an inlet pressure of the regenerative heat exchanger. Also, on the outlet side of the regenerative heat exchanger 4, there are disposed a regenerative-heat-exchanger outlet temperature measuring means 46 for measuring an outlet temperature of the regenerative heat exchanger and a regenerative-heat-exchanger outlet pressure measuring means 55 for measuring an outlet pressure of the regenerative heat exchanger. Values measured by the regenerative-heat-exchanger inlet temperature measuring means 44, the regenerative-heat-exchanger inlet pressure measuring means 54, the regenerative-heat-exchanger outlet temperature measuring means 46, and the regenerative-heat-exchanger outlet pressure measuring means 55 are taken into the control unit 100.

The combustor 5 mixes and burns the intake air preheated by the regenerative heat exchanger 4 and fuel 22 introduced at a flow rate adjusted by a fuel flow adjusting valve 32. High-temperature gas resulting from the combustion flows into the turbine 6. A fuel cutoff valve 31 for cutting off fuel supply is disposed downstream of the fuel flow adjusting valve 32. The fuel cutoff valve 31 and the fuel flow adjusting valve 32 are controlled by the control unit 100.

In the turbine 6, the high-temperature gas supplied from the combustor 5 is expanded to perform work and produces power. The compressor 2 and the generator 7 are driven with the produced power. On the inlet side of the turbine 6, there are disposed an inlet temperature measuring means 47 for measuring an inlet temperature of the turbine and a turbine inlet pressure measuring means 56 for measuring an inlet pressure of the turbine. Also, on the outlet side of the turbine 6, there are disposed a turbine outlet temperature measuring means 48 for measuring an outlet temperature of the turbine and a turbine outlet pressure measuring means 57 for measuring an outlet pressure of the turbine. Values measured by the turbine inlet temperature measuring means 47, the turbine inlet pressure measuring means 56, the turbine outlet temperature measuring means 48, and the turbine outlet pressure measuring means 57 are taken into the control unit 100.

Electric power generated from the generator 7 driven by the turbine 6 is rectified by the rectifier 8 and its frequency is converted by the inverter 10 into a desired one depending on a customer. The electric power is then supplied to a load. At this time, a generator output voltage is converted by the output transformer 11 as required. The output voltage and current of the generator 7 are measured respectively by a generator output voltage measuring means 64 and a generator output current measuring means 65. A voltage between terminals of the capacitor 9 is measured by a capacitor inter-terminal voltage measuring means 66. An output voltage of the output transformer 11 is measured by a load-terminal output voltage measuring means 63. An output current is measured by a load-terminal output current measuring means 62, and an output power is measured by a load-terminal output power measuring means 61. Values measured by the generator output voltage measuring means 64, the generator output current measuring means 65, the capacitor inter-terminal voltage measuring means 66, the load-terminal output voltage measuring means 63, the load-terminal output current measuring means 62, and the load-terminal output power measuring means 61 are taken into the control unit 100.

After recovery of heat in the regenerative heat exchanger 4, the exhaust from the turbine 6 is discharged as a gas-turbine exhaust gas 27 to the outside of a plant. On the exhaust side of the regenerative heat exchanger 4, there are disposed an exhaust temperature measuring means 49 for measuring a temperature of the exhaust gas 27 and an exhaust pressure measuring means 58 for measuring a pressure of the exhaust gas 27. Values measured by the exhaust temperature measuring means 49 and the exhaust pressure measuring means 58 are taken into the control unit 100. As an alternative, the exhaust gas 27 may be introduced to a waste heat recovering unit 13, such as a refrigerator or a boiler, for further recovery of heat, and then finally discharged as the exhaust gas 27 from the waste heat recovering unit to the outside of the plant.

In the above arrangement, instead of the treated supply water 24, warm water or water vapor obtained from the waste heat recovering unit 13 may be supplied to the humidifier 3. Also, instead of the treated supply water 24, cooled water obtained from the waste heat recovering unit 13 may be supplied to the intake air sprayer 1. Additionally, the supply water treating unit 12 is constructed to be adaptable for, in addition to externally supplied water, condensed water, etc. discharged and recovered from, e.g., an air conditioner of the customer.

A method of operating the gas turbine power generator according to this embodiment will be described below with reference to FIGS. 2 to 4.

Figure 2:
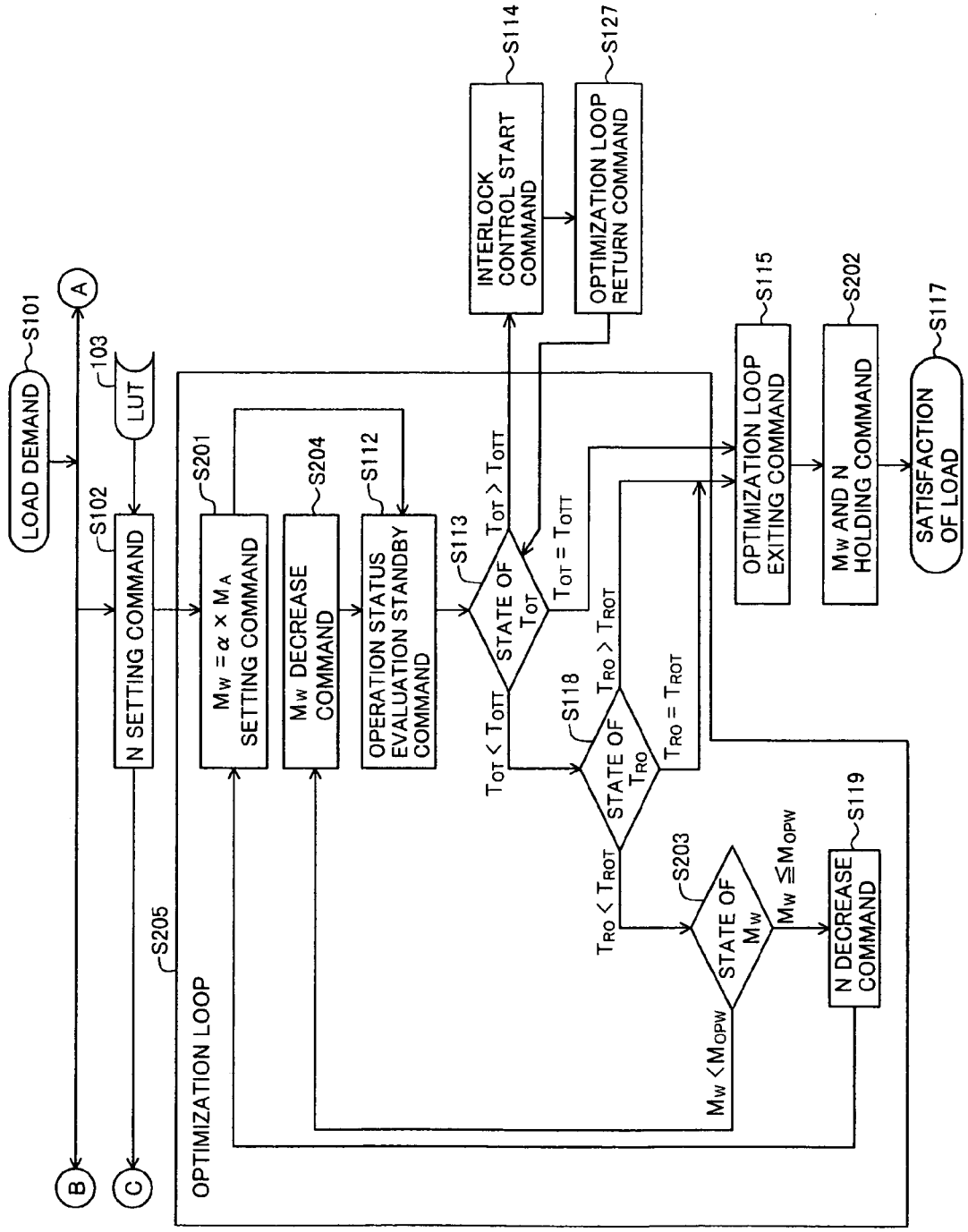
FIG. 2 is a flowchart showing a method of operating the gas turbine power generator according to the first embodiment of the present invention.
Figure 3:
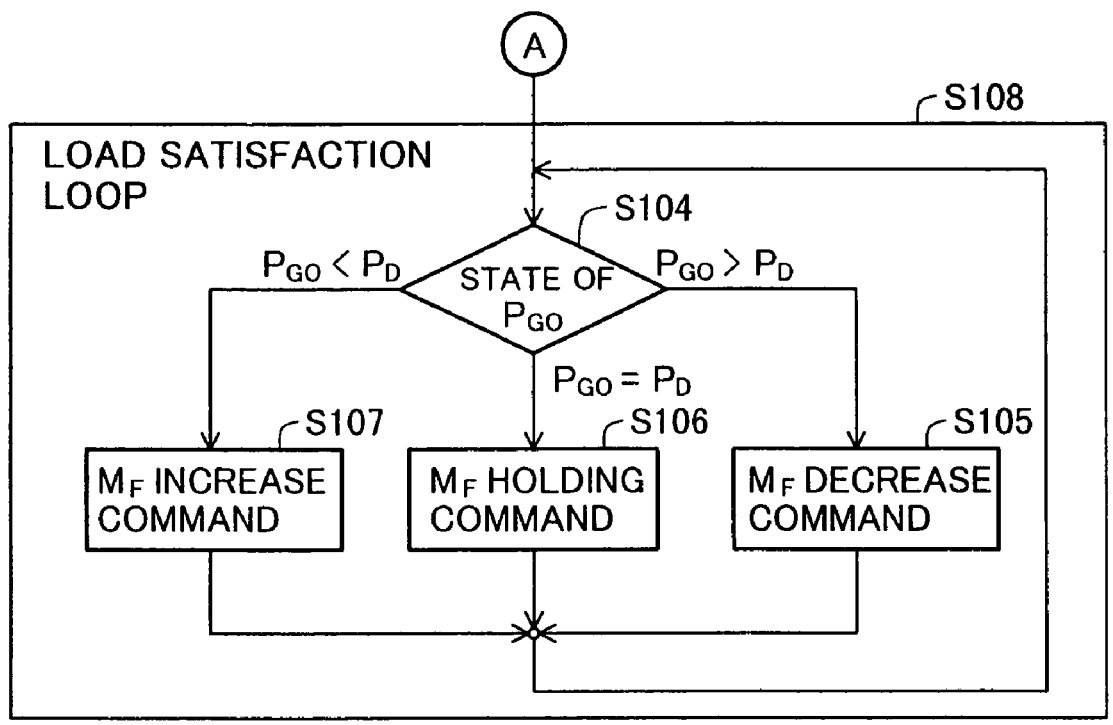
FIG. 3 is a flowchart showing the method of operating the gas turbine power generator according to the first embodiment of the present invention.
Figure 4:
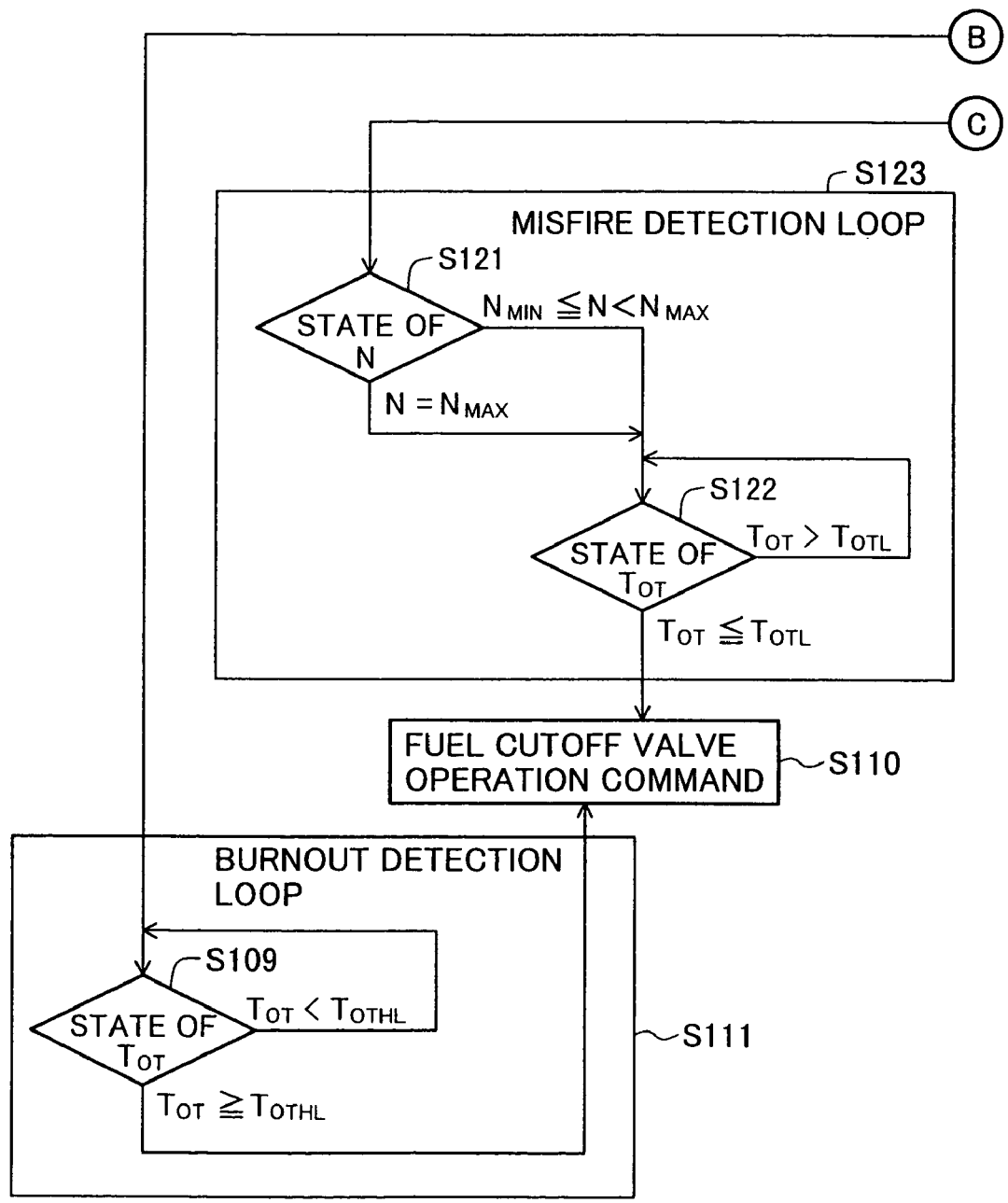
FIG. 4 is a flowchart showing the method of operating the gas turbine power generator according to the first embodiment of the present invention.

FIGS. 2 to 4 are each a flowchart showing the method of operating the gas turbine power generator according to the first embodiment of the present invention. In control flows shown in those flowcharts, (A) in FIG. 2 continues to (A) in FIG. 3 and (B), (C) in FIG. 2 continue respectively to (B), (C) in FIG. 4.

The method of operating the gas turbine power generator according to this embodiment is processed and executed by the control unit 100, and is primarily made up of a load satisfaction loop s108, an optimization loop s205, a misfire detection loop s123, and a burnout detection loop s111. The load satisfaction loop s108, the optimization loop s205, and the misfire detection loop s123 are executed in parallel at the same time.

First, in step s101, the control unit 100 reads a load demand (demanded load power $P_D$).

Then, in step s102, the control unit 100 sets the number of rotations N corresponding to the demanded load by referring to a lookup table 103 which stores memory data such as the number of rotations N corresponding to the demanded load. In parallel to the setting of the number of rotations N in step s102, the load satisfaction loop s108 for continuing fuel supply at a flow rate satisfying the demanded load is executed, whereby the demanded load is always satisfied. Further, the optimization loop s205 and the misfire detection loop s123 are executed in parallel so that the set number of rotations N is obtained. The number of rotations N is adjusted by measuring an output of the generator output voltage measuring means 64 or an output of the capacitor inter-terminal voltage measuring means 66, for example, which is in proportion to the number of rotations N, and by controlling the measured voltage.

The load satisfaction loop s108 is first described. The load satisfaction loop s108 is executed in parallel to the setting of the number of rotations N and functions to continue fuel supply at the fuel flow rate $M_F$ satisfying the demanded load. By keeping the load satisfaction loop s108 under execution, the load demand 101 is always satisfied.

In step s104, the control unit 100 determines the state of a load terminal output power $P_{GO}$ measured by the load-terminal output power measuring means 61. If the load terminal output power $P_{GO}$ is larger than the demanded load power $P_D$ ($P_{GO} > P_D$), the control unit 100 issues a command for decreasing the fuel flow rate $M_F$ and controls the fuel flow adjusting valve 32 in step s105, thereby decreasing the fuel flow rate supplied to the combustor 5. If the load terminal output power $P_{GO}$ is equal to the demanded load power $P_D$ ($P_{GO} = P_D$), the control unit 100 issues a command for holding the fuel flow rate $M_F$ and controls the fuel flow adjusting valve 32 in step s106, thereby holding the fuel flow rate supplied to the combustor 5. If the load terminal output power $P_{GO}$ is smaller than the demanded load power $P_D$ ($P_{GO} < P_D$), the control unit 100 issues a command for increasing the fuel flow rate $M_F$ and controls the fuel flow adjusting valve 32 in step s107, thereby increasing the fuel flow rate supplied to the combustor 5.

Thus, in the load satisfaction loop s108, the demanded load power $P_D$ and the load terminal output power $P_{GO}$ are compared with each other, and feedback control is performed so that both the powers coincide with each other. To achieve more efficient operating conditions while always satisfying the load demand with the load satisfaction loop s108, the optimization loop s205 is executed in parallel.

The optimization loop s205 is now described. The optimization loop s205 is a loop constructed based on the concept of keeping the combustion temperature as high as possible and increasing the power generation efficiency by holding the number of rotations N at minimum within the range satisfying the demanded load while referring to a turbine outlet temperature $T_{OT}$ and a regenerative heat exchanger outlet temperature $T_{RO}$.

The optimization loop s205 executes control such that, after setting a flow rate Mw of the humidifying water to a value resulting from multiplying an air flow rate $M_A$ by a constant α, the flow rate Mw of the humidifying water is gradually reduced to an optimum flow rate Mopw of the humidifying water. The air flow rate $M_A$ is measured by the flow rate measuring unit 14. Alternatively, the air flow rate $M_A$ may be calculated from the temperature and pressure at the inlet of the gas turbine power generator, the number of rotations N, and a compressor performance curve. Also, the constant α is decided, for example, by dividing a flow rate MwMin of the humidifying water in the minimum load operation within the range in which the flow rate Mw of the humidifying water is adjustable and combustion stability is not impaired, by the air flow rate $M_A$ at that time. As an alternative, the constant $\alpha$ may be calculated from a maximum water vapor concentration at which combustion performance, such as combustion stability and unburnt emissions, can be ensured in the combustor 5.

In step s201, the control unit 100 sets, as the flow rate Mw of the humidifying water, the value resulting from multiplying the air flow rate $M_A$ by the constant $\alpha$.

Then, in step s112, the control unit 100 remains standby until the operation state will be steady.

Then, in step s113, the control unit 100 compares the turbine outlet temperature $T_{OT}$ with the turbine outlet setting temperature $T_{OTT}$. In this respect, the turbine outlet setting temperature $T_{OTT}$ is decided as follows. A turbine outlet maximum setting temperature $T_{OTTH}$ during the operation is determined from a turbine performance curve by using the ambient air temperature and the atmosphere pressure measured respectively by the ambient air temperature measuring means 41 and the atmosphere pressure measuring means 51 during the operation, the air flow rate $M_A$ at the rated number of rotations $N_S$, and a rated turbine inlet temperature $T_{ITS}$. A lower one of the turbine outlet maximum setting temperature $T_{OTTH}$ and a regenerative heat exchanger allowable temperature $T_{RMAX}$ is set as the turbine outlet setting temperature $T_{OTT}$. In a district where a variation in temperature of open air is small or in a district where an annual highest atmospheric temperature is relatively low, the turbine outlet maximum setting temperature $T_{OTTH}$ and a regenerative heat exchanger allowable temperature $T_{RMAX}$ decided using the above-described method at a standard ambient air temperature and atmosphere pressure can be set as the turbine outlet setting temperature $T_{OTT}$ and used thoroughly. Instead of comparing the turbine outlet temperature $T_{OT}$ with the turbine outlet setting temperature $T_{OTT}$, the turbine inlet temperature $T_{IT}$ may be compared with a turbine inlet setting temperature $T_{ITT}$. Here, the turbine inlet setting temperature $T_{ITT}$ means a maximum value of the turbine inlet temperature $T_{IT}$ that is allowable for the turbine.

As a result of comparing the turbine outlet temperature $T_{ot}$ with the turbine outlet setting temperature $T_{OTT}$, if the turbine outlet temperature $T_{OT}$ is higher than the turbine outlet setting temperature $T_{OTT}$ ($T_{OT}>T_{OTT}$), the control unit 100 issues an interlock control start command in step s114. Interlock control is executed to avoid a trouble, such as burnout of the turbine 6 or the combustor 5, when the turbine outlet temperature $T_{OT}$ is higher than the turbine outlet setting temperature $T_{OTT}$. Details of the interlock control will be described later with reference to FIG. 3.

If the turbine outlet temperature $T_{OT}$ is equal to the turbine outlet setting temperature $T_{OTT}$ ($T_{OT}=T_{OTT}$), the control unit 100 issues a command for exiting the optimization loop in step s115. Then, in step s202, a command is issued to hold the flow rate Mw of the humidifying water and the number of rotations N at the same values as those set at that time. The load is thereby satisfied in step s117.

If the turbine outlet temperature $T_{OT}$ is lower than the turbine outlet setting temperature $T_{OTT}$ ($T_{OT}<T_{OTT}$), the control unit 100 compares the regenerative heat exchanger outlet temperature $T_{RO}$ with the regenerative-heat-exchanger outlet setting temperature $T_{ROT}$ in step s118.

As a result of comparing the regenerative heat exchanger outlet temperature $T_{RO}$ with the regenerative-heat-exchanger outlet setting temperature $T_{ROT}$, if the regenerative heat exchanger outlet temperature $T_{RO}$ is not lower than the regenerative-heat-exchanger outlet setting temperature $T_{ROT}$ ($T_{RO} \geq T_{ROT}$), the control unit 100 issues the command for exiting the optimization loop in step s115. Then, in step s202, the control unit 100 issues the command for holding the flow rate Mw of the humidifying water and the number of rotations N at the same values as those set at that time.

If the regenerative heat exchanger outlet temperature $T_{RO}$ is lower than the regenerative-heat-exchanger outlet setting temperature $T_{ROT}$ in ($T_{RO}<T_{ROT}$), the control unit 100 compares the flow rate Mw of the humidifying water with the optimum flow rate MOpw of the humidifying water in step s203.

As a result of comparing the flow rate Mw of the humidifying water with the optimum flow rate MOpw of the humidifying water, if the flow rate Mw of the humidifying water is larger than the optimum flow rate MOpw of the humidifying water (Mw>MOpw), the control unit 100 issues a command for decreasing the flow rate Mw of the humidifying water in step s204. When setting a decrease amount of the flow rate Mw of the humidifying water in this step, the decrease amount is set to, for example, the least possible value within a flow rate adjustable range.

After decreasing the flow rate Mw of the humidifying water, the control unit 100 remains standby in step s112 until the operation state will be steady, and then repeats in step s113 a sequence of control loop for comparing again the turbine outlet temperature $T_{OT}$ with the turbine outlet setting temperature $T_{OTT}$.

If the flow rate Mw of the humidifying water is not larger than the optimum flow rate MOpw of the humidifying water (Mw$\leq$MOpw), the control unit 100 issues a command for decreasing the number of rotations N in step s119. When setting a decrease amount of the number of rotations N in this step, a change amount of the number of rotations is set to, for example, the minimum number of rotations that is significantly changeable by means for controlling the number of rotations.

After decreasing the number of rotations N, the control unit 100 sets, in step s201, the flow rate Mw of the humidifying water to the value resulting from multiplying the air flow rate $M_A$ by the constant $\alpha$. Subsequently, the control unit 100 remains standby in step s112 until the operation state will be steady, and then repeats in step s113 a sequence of control loop for comparing again the turbine outlet temperature $T_{OT}$ with the turbine outlet setting temperature $T_{OTT}$.

Herein, the optimum flow rate MOpw of the humidifying water means the flow rate Mw of the humidifying water which is required for making the intake air temperature coincident with the saturation vapor temperature at the inlet of the regenerative heat exchanger 4. The optimum flow rate MOpw of the humidifying water can be decided by measuring the pressure and temperature at the inlet of the regenerative heat exchanger 4 and determining a value of the optimum flow rate MOpw from a saturation temperature formula. As an alternative, the saturation temperature may be calculated in advance, and the optimum flow rate MOpw of the humidifying water corresponding to required ranges of pressure and temperature at the inlet of the regenerative heat exchanger 4 may be stored as memory data in a lookup table. Further, instead of measuring the pressure and temperature at the inlet of the regenerative heat exchanger 4, the pressure and temperature at the inlet of the regenerative heat exchanger may be calculated by measuring the air flow rate and the pressure and temperature at the inlet of the compressor, and determining the compressor efficiency and compression ratio from a measured value of the number of rotations N and a performance curve approximation formula for the compressor. In addition, when deciding the optimum flow rate MOpw of the humidifying water by the above-described method, it is also possible to employ the pressure and temperature on the delivery side of the compressor instead of the pressure and temperature at the inlet of the regenerative heat exchanger.

In parallel to the load satisfaction loop s108 and the optimization loop s120 described above, the temperature excessive rise (burnout) detection loop s111 and the misfire detection loop s123 are always executed.

In the temperature excessive rise detection loop s111, the control unit 100 compares, in step s109, the turbine outlet temperature $T_{OT}$ measured by the turbine outlet temperature measuring means 48 with a turbine outlet upper-limit temperature $T_{OTHL}$. If the turbine outlet temperature $T_{OT}$ is not lower than the turbine outlet upper-limit temperature $T_{OTHL}$, this means a large possibility of risk of device burnout. In step s110, therefore, the control unit 100 operates the fuel cutoff valve 31 at once to cut off the supply of the fuel 22 and to stop the power generation. At this time, when the turbine outlet temperature exceeds a predetermined alarm setting temperature, an alarm is issued to avoid the temperature of the turbine 6 from rising excessively. The alarm setting temperature is set to a higher value depending on a rise of the open air temperature.

In the misfire detection loop s123, the control unit 100 determines the state of the number of rotations N in step s121. If the number of rotations N is not lower than the number of rotations $N_{MIN}$ at the time of ignition and is not higher than the number of rotations $N_{MAX}$ at the time of maximum output ($N_{MIN} \leq N \leq N_{MAX}$), the control unit 100 determines the turbine outlet temperature $T_{OT}$ in step s122. If the turbine outlet temperature $T_{OT}$ is not higher than a turbine outlet lower-limit temperature $T_{OTL}$ ($T_{OT} \leq T_{OTL}$), the control unit 100 operates, in step s110, the fuel cutoff valve 31 at once to cut off the supply of the fuel 22 and to stop the power generation.

An interlock control sequence for use in the method of operating the gas turbine power generator according to this embodiment will be described below with reference to FIG. 5.

Figure 5:
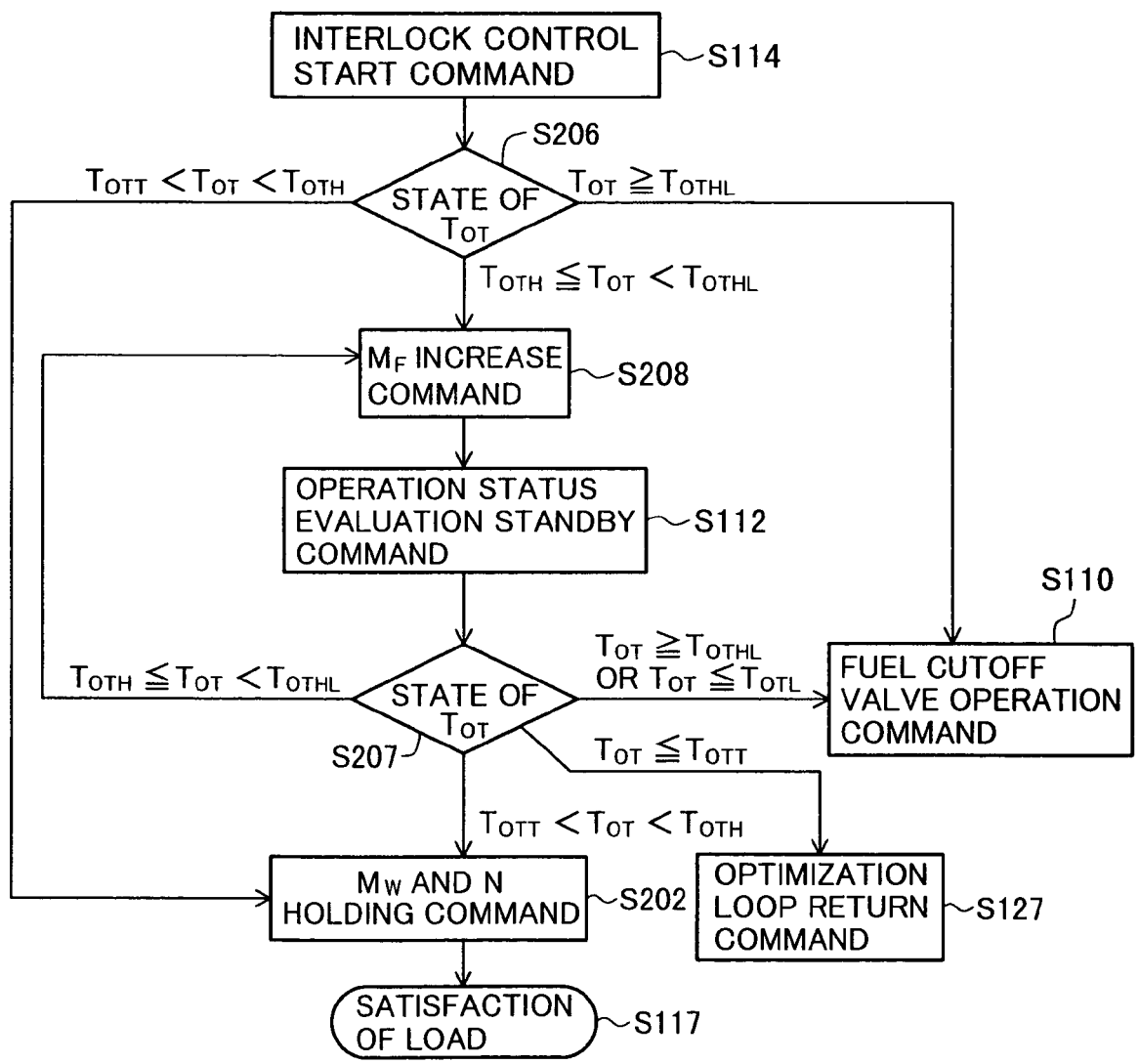
FIG. 5 is a flowchart showing control procedures of an interlock control sequence for use in the method of operating the gas turbine power generator according to the first embodiment of the present invention.

FIG. 5 is a flowchart showing control procedures of the interlock control sequence used in the method of operating the gas turbine power generator according to the first embodiment of the present invention.

In the interlock control sequence, if the turbine outlet temperature $T_{OT}$ is not lower than the turbine outlet upper-limit temperature $T_{OTHL}$, this means a large possibility of risk of device burnout. Therefore, the control unit operates the fuel cutoff valve 31 at once to cut off the supply of the fuel 22 and to stop the power generation.

When an interlock control start command is issued in step s114, the control unit 100 compares, in step s206, the turbine outlet temperature $T_{OT}$ measured by the turbine outlet temperature measuring means 48 with both a turbine outlet higher setting temperature $T_{OTH}$ and the turbine outlet upper-limit temperature $T_{OTHL}$.

If the turbine outlet temperature $T_{OT}$ is not lower than the turbine outlet upper-limit temperature $T_{OTHL}$ ($T_{OT} \geq T_{OTHL}$), this means a large possibility of risk of device burnout. I step s110, therefore, the control unit 100 operates the fuel cutoff valve 31 at once to cut off the supply of the fuel 22 and to stop the power generation.

If the turbine outlet temperature $T_{OT}$ is higher than the turbine outlet setting temperature $T_{OTT}$ and is lower than the turbine outlet higher setting temperature $T_{OTH}$ ($T_{OTT} < T_{OT} < T_{OTH}$), the control unit 100 issues, in step s202, the command for holding the flow rate Mw of the humidifying water and the number of rotations N at the same values as those set at that time.

If the turbine outlet temperature $T_{OT}$ is not lower than the turbine outlet higher setting temperature $T_{OTH}$ and is lower than the turbine outlet upper-limit temperature $T_{OTHL}$ ($T_{OTH} \leq T_{OT} < T_{OTHL}$), the control unit 100 issues, in step s208, a command for increasing the flow rate Mw of the humidifying water so as to provide the operation state with a lower possibility of risk. When setting an increase amount of the flow rate Mw of the humidifying water, the increase amount is preferably set, for example, to be equal to the decrease amount of the flow rate Mw of the humidifying water, which is obtained with the command issued in step s204 for decreasing the flow rate Mw of the humidifying water.

After increasing the flow rate Mw of the humidifying water, the control unit 100 remains standby in step s112 until the operation state will be steady, and then compares in step s207 the turbine outlet temperature $T_{OT}$ with each of the turbine outlet setting temperature $T_{OTT}$, the turbine outlet higher setting temperature $T_{OTH}$, the turbine outlet upper-limit temperature $T_{OTHL}$, and the turbine outlet lower-limit temperature $T_{OTL}$.

As a comparison result, if the turbine outlet temperature $T_{OT}$ is not lower than the turbine outlet upper-limit temperature $T_{OTHL}$ ($T_{OT} \geq T_{OTHL}$), this means a large possibility of risk of device burnout. In step s110, therefore, the control unit 100 operates the fuel cutoff valve 31 at once to cut off the supply of the fuel 22 and to stop the power generation. Further, if the increase amount of the flow rate Mw of the humidifying water is too large, there is a possibility of misfire. Accordingly, if the turbine outlet temperature $T_{OT}$ is not higher than the turbine outlet lower-limit temperature $T_{OTL}$ ($T_{OT} \leq T_{OTL}$), the control unit 100 also operates, in step s110, the fuel cutoff valve 31 at once to cut off the supply of the fuel 22 and to stop the power generation.

If the turbine outlet temperature $T_{OT}$ is higher than the turbine outlet setting temperature $T_{OTT}$ and is lower than the turbine outlet higher setting temperature $T_{OTH}$ ($T_{OTT} < T_{OT} < T_{OTH}$), the control unit 100 issues, in step s202, the command for holding the flow rate Mw of the humidifying water and the number of rotations N at the same values as those set at that time.

If the turbine outlet temperature $T_{OT}$ is still not lower than the turbine outlet higher setting temperature $T_{OTH}$ and is lower than the turbine outlet upper-limit temperature $T_{OTHL}$ ($T_{OTH} \leq T_{OT} < T_{OTHL}$), the control unit 100 issues, in step s208, a command for increasing the flow rate Mw of the humidifying water again so as to provide the operation state with a lower possibility of risk.

If the turbine outlet temperature $T_{OT}$ is higher than the turbine outlet setting temperature $T_{OTT}$ and is lower than the turbine outlet higher setting temperature $T_{OTH}$ ($T_{OTT} < T_{OT} < T_{OTH}$), the control unit 100 issues, in step s202, the command for holding the flow rate Mw of the humidifying water and the number of rotations N at the same values as those set at that time.

If the turbine outlet temperature $T_{OT}$ is not higher than the turbine outlet setting temperature $T_{OTT}$ ($T_{OT} \leq T_{OTT}$), the control unit 100 issues, in step s127, a command for returning to the optimization loop. Then, in step s113 of the optimization loop s205 shown in FIG. 2, the control unit 100 compares the turbine outlet temperature $T_{OT}$ with the turbine outlet setting temperature $T_{OTT}$ for repeatedly executing a sequence of control loop.

With the gas turbine power generator according to this embodiment, as described above, the power generation output and the power generation efficiency can be increased by applying a spray of intake air to a gas turbine and humidifying the intake air on the delivery side of the compressor.

The power generation output and the power generation efficiency achieved with the method of operating the gas turbine power generator according to this embodiment will be described below with reference to FIGS. 6 to 9 in comparison with a known gas turbine power generator.

It is here assumed that the gas turbine power generator of this embodiment and the known gas turbine power generator have the same pressure ratio, the turbine inlet temperature and the number of rotations under rated conditions, and component units, such as a turbine, a compressor, a generator and a regenerative heat exchanger, have characteristics substantially identical to each other. However, the gas turbine power generator of this embodiment has a regenerative heat exchanger capacity and a turbine capacity both increased in consideration of an increase in amount of a working fluid caused by the humidification.

Also, the gas turbine power generator of this embodiment is a 100-kW class gas turbine power generator designed to have a pressure ratio of 3.5 and a turbine inlet temperature of 970° C. under the conditions of an ambient air temperature of 15° C. and a relative humidity of 30%. Furthermore, in the gas turbine power generator of this embodiment, the air is always cooled at the compressor inlet with the intake air sprayer 1 by using 0.2 weight percent of humidifying water with respect to the air mass flow rate.

Figure 6:
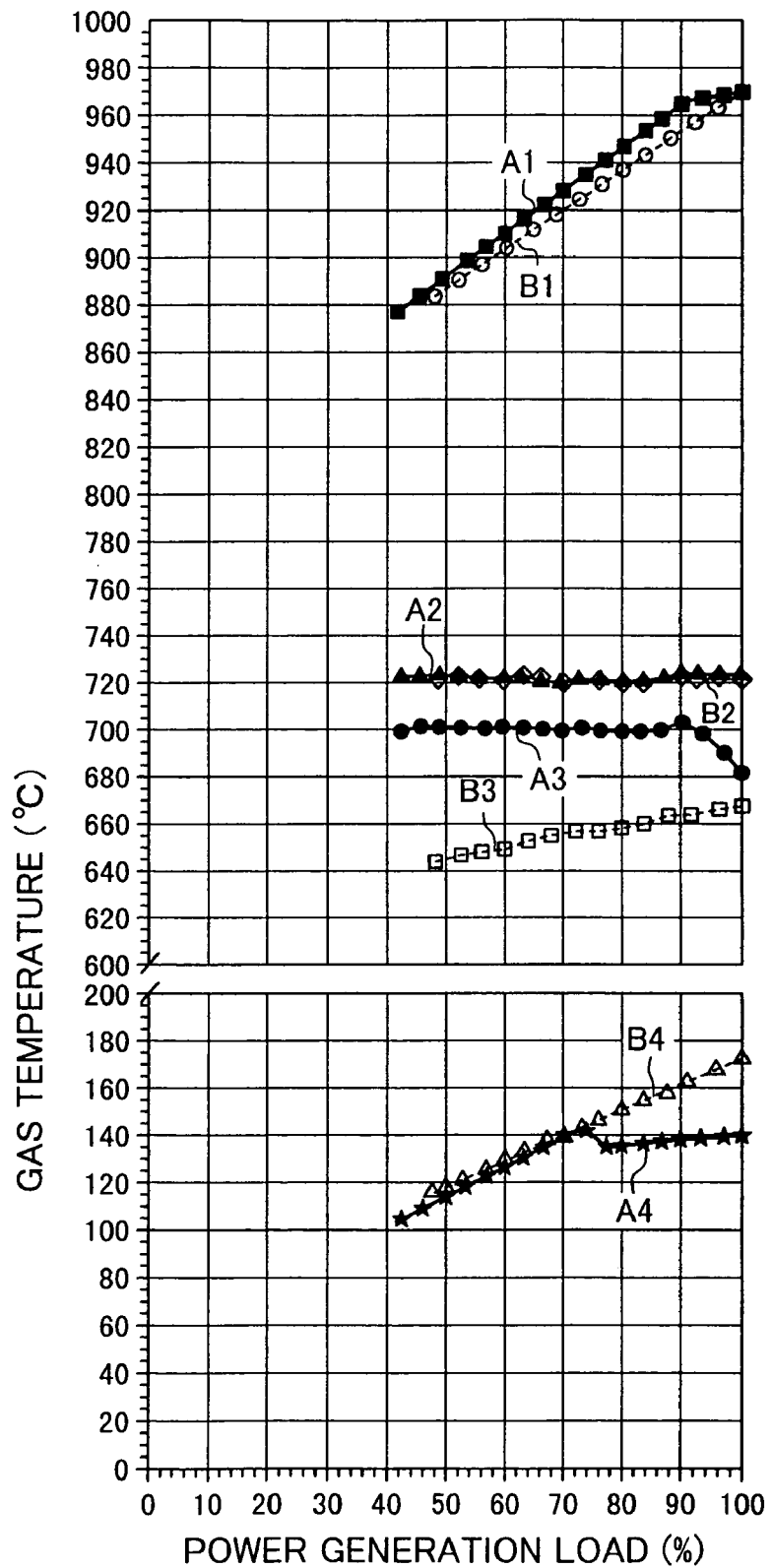
FIG. 6 is an explanatory graph showing turbine inlet and outlet temperatures and regenerative heat exchanger inlet and outlet temperatures with respect to a power generation load in the gas turbine power generator according to the first embodiment of the present invention.

With reference to FIG. 6, a description is first made of turbine inlet and outlet temperatures and regenerative heat exchanger inlet and outlet temperatures with respect to a power generation load in the gas turbine power generator of this embodiment in comparison with those in the known gas turbine power generator.

FIG. 6 is an explanatory graph showing turbine inlet and outlet temperatures and regenerative heat exchanger inlet and outlet temperatures with respect to a power generation load in the gas turbine power generator according to the first embodiment of the present invention. In FIG. 6, the vertical axis represents temperature and the horizontal axis represents the power generation load normalized with the rated load set to 100%.

In the gas turbine power generator of this embodiment, the humidification on the delivery side of the compressor is not performed at the power generation load of not larger than 73% because the flow rate resulting from multiplying the air flow rate $M_A$ by the constant α becomes lower than the controllable flow rate. In the range of power generation load from 73% to 90%, the humidification is performed at the optimum flow rate MOpw of the humidifying water in accordance with the operation control method shown in FIGS. 2 to 4. In the range of power generation load not lower than 90%, when the flow rate Mw of the humidifying water is decreased in accordance with the optimization loop from the value resulting from multiplying the air flow rate $M_A$ by the constant α, the turbine outlet temperature $T_{OT}$ reaches the turbine outlet setting temperature $T_{OTT}$ before the flow rate Mw of the humidifying water reaches the optimum flow rate MOpw. Therefore, the humidification is performed at a flow rate in excess of the optimum flow rate MOpw of the humidifying water.

A solid line A1 indicates the turbine inlet temperature with respect to the power generation load in the gas turbine power generator of this embodiment, and a solid line A2 indicates the turbine outlet temperature with respect to the power generation load in the gas turbine power generator of this embodiment. On the other hand, a broken line B1 indicates the turbine inlet temperature with respect to the power generation load in the known gas turbine power generator, and a broken line B2 indicates the turbine outlet temperature with respect to the power generation load in the known gas turbine power generator.

At any power generation load, there is no significant difference in the turbine inlet and outlet temperature between the gas turbine power generator of this embodiment and the known gas turbine power generator.

A solid line A3 indicates the regenerative heat exchanger outlet temperature with respect to the power generation load in the gas turbine power generator of this embodiment, and a broken line B3 indicates the regenerative heat exchanger outlet temperature with respect to the power generation load in the known gas turbine power generator. As seen from the comparing, with the operation control according to this embodiment, the regenerative heat exchanger outlet temperature can be consistently held higher than that in the known gas turbine power generator.

Further, a solid line A4 indicates the regenerative heat exchanger inlet temperature with respect to the power generation load in the gas turbine power generator of this embodiment, and a broken line B4 indicates the regenerative heat exchanger inlet temperature with respect to the power generation load in the known gas turbine power generator. As seen from the comparison, the regenerative heat exchanger outlet temperature lowers in the range of power generation load not lower than 90% in which the flow rate Mw of the humidifying water exceeds the optimum flow rate, but it is still higher than the regenerative heat exchanger outlet temperature in the known gas turbine power generator.

In the range of power generation load not lower than 73% in which the humidification is performed with the humidifier 3, the regenerative heat exchanger inlet temperature is reduced to a value substantially coincident with the saturation temperature at the regenerative heat exchanger inlet pressure by carrying out the operation control in accordance with this embodiment. Thus, the temperature of turbine exhaust as a high-temperature side fluid flowing into the regenerative heat exchanger is almost the same in both the gas turbine power generators of this embodiment and of the known type, and the temperature of air delivered as a low-temperature side fluid from the compressor is lower in the gas turbine power generator of this embodiment than in the known gas turbine power generator. Hence, the regenerative heat exchange amount is greatly increased.

Figure 7:
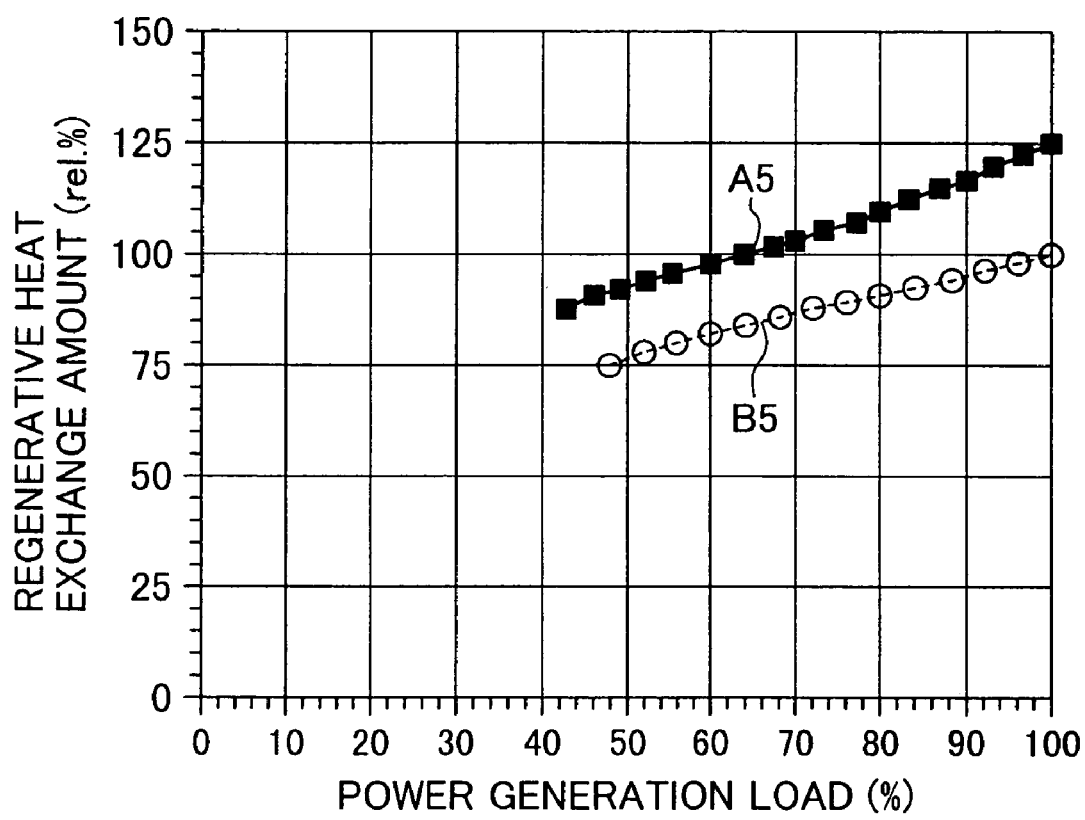
FIG. 7 is an explanatory graph showing a regenerative heat exchange amount with respect to a power generation load in the gas turbine power generator according to the first embodiment of the present invention.

With reference to FIG. 7, a description is now made of the regenerative heat exchange amount with respect to the power generation load in the gas turbine power generator of this embodiment in comparison with that in the known gas turbine power generator.

FIG. 7 is an explanatory graph showing the regenerative heat exchange amount with respect to the power generation load in the gas turbine power generator according to the first embodiment of the present invention. In FIG. 7, the vertical axis represents the regenerative heat exchange amount normalized on condition that the regenerative heat exchange amount at the rated load in the known gas turbine power generator is set to 100%, and the horizontal axis represents the power generation load normalized with the rated load set to 100%.

A solid line A5 indicates the regenerative heat exchange amount with respect to the power generation load in the gas turbine power generator of this embodiment, and a broken line B5 indicates the regenerative heat exchange amount with respect to the power generation load in the known gas turbine power generator.

At any power generation load, the regenerative heat exchange amount in the gas turbine power generator of this embodiment is 15% or more larger than that in the known gas turbine power generator. In the range of power generation load not lower than 73%, particularly, the regenerative heat exchange amount increases with respect to the power generation load at a greater gradient in the gas turbine power generator of this embodiment than in the known gas turbine power generator. The reason is that, in addition to an increase of the capacity of the regenerative heat exchanger, the intake air is in the saturation state at the inlet of the regenerative heat exchanger as a result of the humidification on the delivery side of the compressor, whereby the humidified intake air has the specific heat and the heat transfer rate larger than those of not-humidified air, and the regenerative heat exchanger inlet temperature is reduced to provide a larger temperature difference between the inlet and the outlet of the regenerative heat exchanger.

Figure 8:
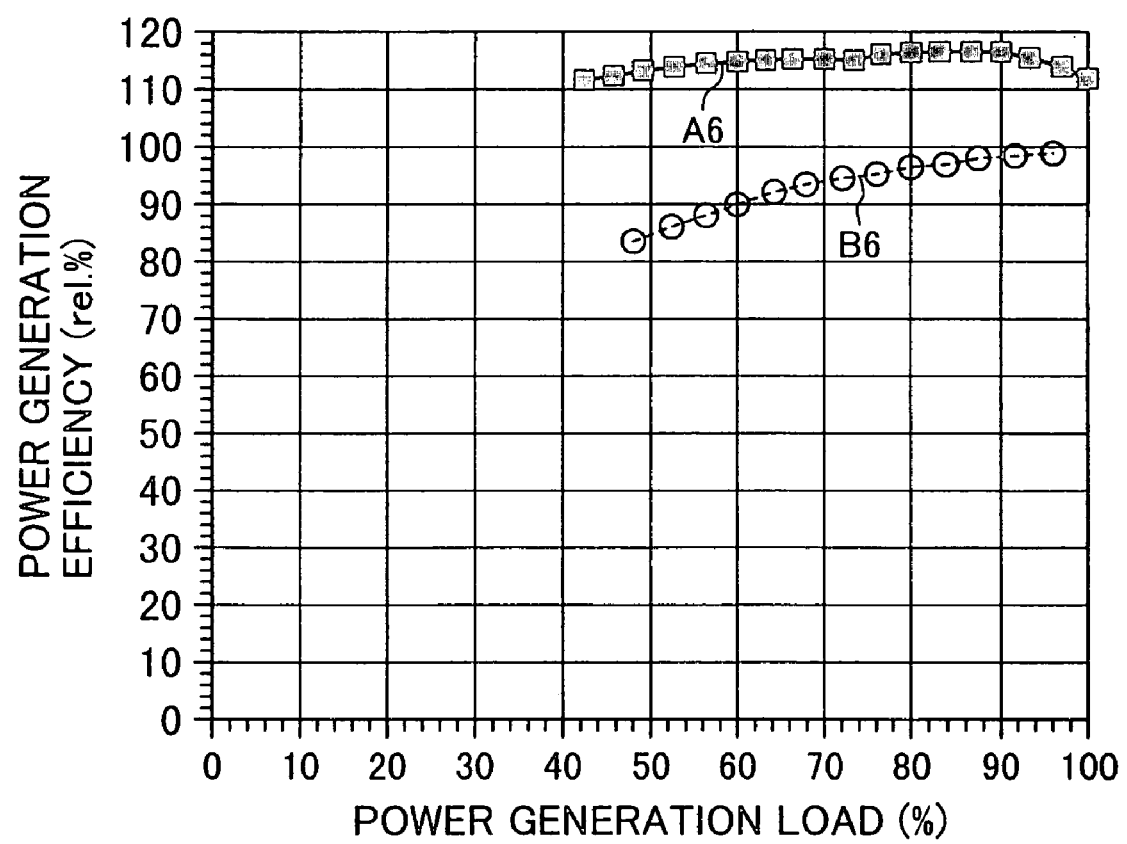
FIG. 8 is an explanatory graph showing power generation efficiency with respect to a power generation load in the gas turbine power generator according to the first embodiment of the present invention.

With reference to FIG. 8, a description is now made of the power generation efficiency with respect to the power generation load in the gas turbine power generator of this embodiment in comparison with that in the known gas turbine power generator.

FIG. 8 is an explanatory graph showing the power generation efficiency with respect to the power generation load in the gas turbine power generator according to the first embodiment of the present invention. In FIG. 8, the vertical axis represents the power generation efficiency normalized on condition that the power generation efficiency at the rated load in the known gas turbine power generator is set to 100%, and the horizontal axis represents the power generation load normalized with the rated load set to 100%.

A solid line A6 indicates the power generation efficiency with respect to the power generation load in the gas turbine power generator of this embodiment, and a broken line B6 indicates the power generation efficiency with respect to the power generation load in the known gas turbine power generator.

At any power generation load, the power generation efficiency is higher in the gas turbine power generator of this embodiment than in the known gas turbine power generator. Also, while the power generation efficiency in the known gas turbine power generator reduces as the power generation load decreases, the power generation efficiency in the gas turbine power generator of this embodiment moderately increases in the range of power generation load from 100% to 90% and is substantially constant in the range of the power generation load not larger than 90%.

Such a moderate increase of the power generation efficiency in the range of power generation load from 100% to 90% is attributable to that the operation state following the power generation load is achieved just by regulating the flow rate Mw of the humidifying water in the state in which it exceeds the optimum flow rate MOpw of the humidifying water, and the flow rate Mw of the humidifying water becomes closer to the optimum flow rate MOpw as the load decreases.

Figure 9:
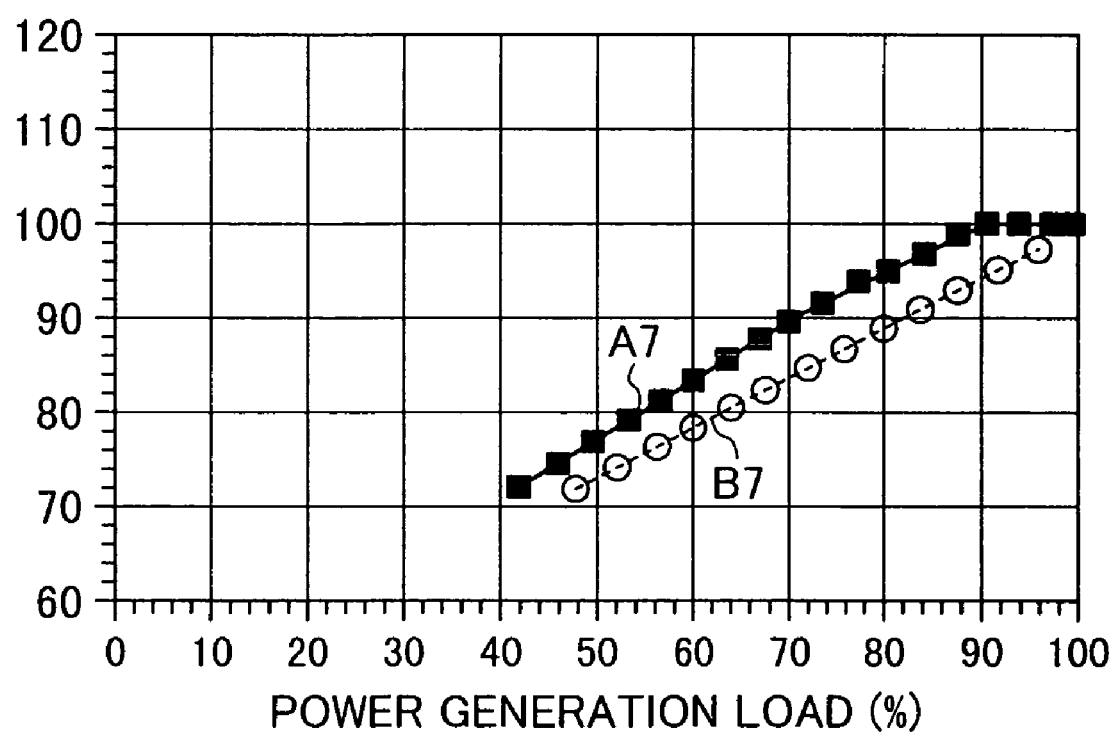
FIG. 9 is an explanatory graph showing the number of rotations with respect to a power generation load in the gas turbine power generator according to the first embodiment of the present invention.

With reference to FIG. 9, a description is now made of the number of rotations with respect to the power generation load in the gas turbine power generator of this embodiment in comparison with that in the known gas turbine power generator.

FIG. 9 is an explanatory graph showing the number of rotations with respect to the power generation load in the gas turbine power generator according to the first embodiment of the present invention. In FIG. 9, the vertical axis represents the number of rotations normalized on condition that the number of rotations at the rated load is set to 100%, and the horizontal axis represents the power generation load normalized with the rated load set to 100%.

A solid line A7 indicates the number of rotations with respect to the power generation load in the gas turbine power generator of this embodiment, and a broken line B7 indicates the number of rotations with respect to the power generation load in the known gas turbine power generator.

As is apparent from FIG. 9, in the range of power generation load from 100% to 90%, the number of rotations of the gas turbine power generator of this embodiment is held at the rated number of rotations and does not vary. In addition, a variation width of the number of rotations in the range of power generation load from, e.g., 50% to the rated load is also small. Thus, with the operation control theory according to this embodiment, the frequency of variation in the number of rotations can be reduced as compared with that in the prior art, and high-cycle thermal fatigue of the turbine can be suppressed so as to prolong the service life of the gas turbine power generator of this embodiment.

With this embodiment, as described above, it is possible to increase the power generation efficiency in the partial load operation and to decrease a variation in the number of rotations caused by a variation in the power generation load.

Next, the construction and operation of a gas turbine power generator according to a second embodiment of the present invention will be described below with reference to FIG. 10. The overall construction of the gas turbine power generator according to this embodiment is the same as that shown in FIG. 1.

Figure 10:
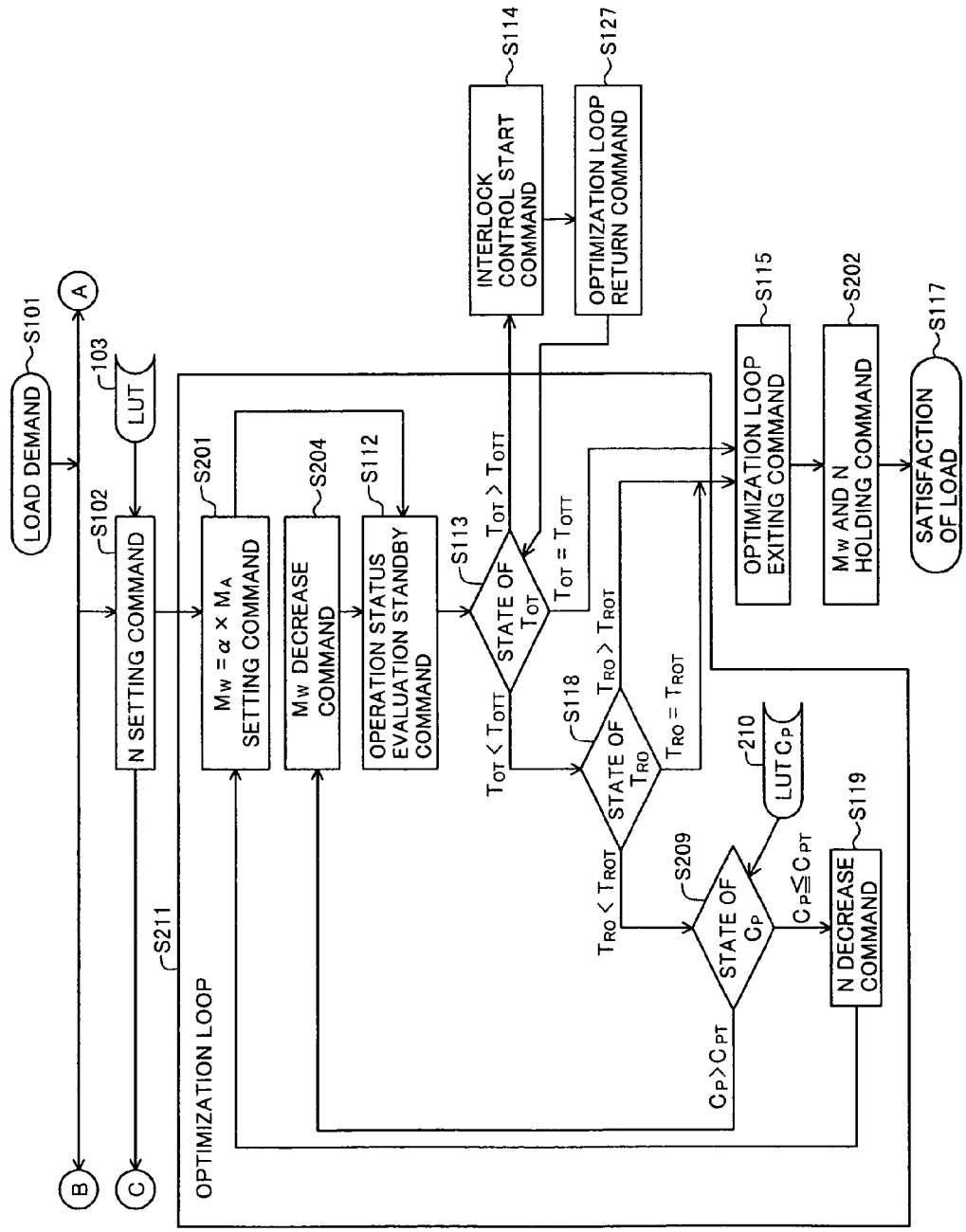
FIG. 10 is a flowchart showing a method of operating a gas turbine power generator according to a second embodiment of the present invention.

The following description is therefore made of a method of operating the gas turbine power generator according to this embodiment with reference to FIG. 10.

FIG. 10 is a flowchart showing the method of operating the gas turbine power generator according to the second embodiment of the present invention. In control flows shown in the flowchart, (A) in FIG. 10 continues to (A) in FIG. 3 and (B), (C) in FIG. 10 continue respectively to (B), (C) in FIG. 4. Additionally, the same step numbers as those in FIGS. 2 to 4 represent the same control procedures.

Since basic control procedures of the operating method are the same as those shown in FIGS. 2 to 4, a description is made primarily of different points in comparison with FIGS. 2 to 4. In this embodiment, processing of step s209 is executed instead of step s203 shown in FIG. 2.

In step s209, the control unit 100 compares intake-air specific heat $C_P$ at the inlet of the regenerative heat exchanger with intake-air specific heat $C_{PT}$ in the saturation state. As a result of comparing the intake-air specific heat $C_P$ with the intake-air specific heat $C_{PT}$ in the saturation state, if the intake-air specific heat $C_P$ is larger than the intake-air specific heat $C_{PT}$ in the saturation state ($C_P > C_{PT}$), the control unit 100 issues, in step s204, the command for decreasing the flow rate Mw of the humidifying water. If the intake-air specific heat $C_P$ is not larger than the intake-air specific heat $C_{PT}$ in the saturation state ($C_P \leq C_{PT}$), the control unit 100 issues, in step s119, the command for decreasing the number of rotations N.

Here, the intake-air specific heat $C_P$ is decided from the following intake-air specific heat calculation formula (1) derived on condition that the heat exchange amount on the compressor delivery air side and the heat exchange amount on the turbine exhaust gas side are equal to each other for the regenerative heat exchanger 4;

$$C_P = C_{PG}(M_A + M_F/M_A)((T_{OT} - T_{EX}/(T_{RO} - T_{RI})) \quad (1)$$

where $C_P$: intake-air specific heat, $C_{PG}$: fuel gas specific heat, $M_A$: air flow rate, $M_F$: fuel flow rate, $T_{RI}$: regenerative heat exchanger inlet temperature, $T_{RO}$: regenerative heat exchanger outlet temperature, $T_{OT}$: turbine outlet temperature, and $T_{EX}$: exhaust temperature.

The intake-air specific heat $C_{PT}$ in the saturation state can be decided by determining the saturation water vapor temperature using a saturation-water-vapor temperature calculation formula from the pressure and temperature of the intake air on the delivery side of the compressor 2, and by employing a specific heat calculation formula for a gas mixture from the water vapor specific heat and the water vapor partial pressure in that condition, as well as from the pressure and specific heat of the intake air on the delivery side of the compressor 2. As an alternative, values of the intake-air specific heat $C_{PT}$ in the saturation state with respect to pressure and temperature over ranges possibly occurred on the delivery side of the compressor may be stored as memory data in a lookup table 210 beforehand and used when deciding the intake-air specific heat $C_{PT}$ in the saturation state. Further, instead of measuring the pressure and temperature at the inlet of the regenerative heat exchanger, the pressure and temperature at the inlet of the regenerative heat exchanger may be calculated by measuring the intake-air flow rate and the pressure and temperature at the inlet of the compressor, and determining the compressor efficiency and compression ratio from a measured value of the number of rotations N and a performance curve approximation formula for the compressor.

In practical use, for example, when the gas turbine power generator of this embodiment is coupled to a line system or when it is used in combination with an electricity storage plant, the gas turbine power generator is not always required to satisfy all of the load demand by itself alone because deficiency of the load terminal output power $P_{GO}$ with respect to the demanded load power $P_D$ can be compensated by purchasing power from the line system or by supplying power from the electricity storage plant. In that case, it is also possible to employ a method of determining respective values of a target flow rate MwT of the humidifying water, the target number of rotations $N_T$ and a target fuel flow rate $M_{FT}$ which are required to realize the operation state satisfying the load demand and maximizing the power generation efficiency, and carrying out steady operation with the determined values set to control target values. The respective values of the target flow rate MwT of the humidifying water, the target number of rotations $N_T$ and the target fuel flow rate $M_{FT}$ can be determined, for example, by calculating respective values of the intake-air specific heat $C_P$, the air flow rate $M_A$ and the fuel flow rate $M_F$ at which the regenerative heat exchanger outlet temperature $T_{RO}$ in the right side of the formula (1) is maximized.

Thus, this embodiment can eliminate the necessity of changing the control target values depending on the operation state, and can minimize a variation in the number of rotations. In some cases, however, the load terminal output power $P_{GO}$ may become insufficient with respect to the demanded load power $P_D$ until the operation state reaches the steady condition.

With this embodiment, as described above, it is possible to increase the power generation efficiency in the partial load operation, and to decrease a variation in the number of rotations caused by a variation in the power generation load.

Further, the necessity of changing the control target values depending on the operation state is eliminated, and a variation in the number of rotations can be minimized.

Next, the construction and operation of a gas turbine power generator according to a third embodiment of the present invention will be described below with reference to FIGS. 11 to 13. The overall construction of the gas turbine power generator according to this embodiment is the same as that shown in FIG. 1.

Figure 11:
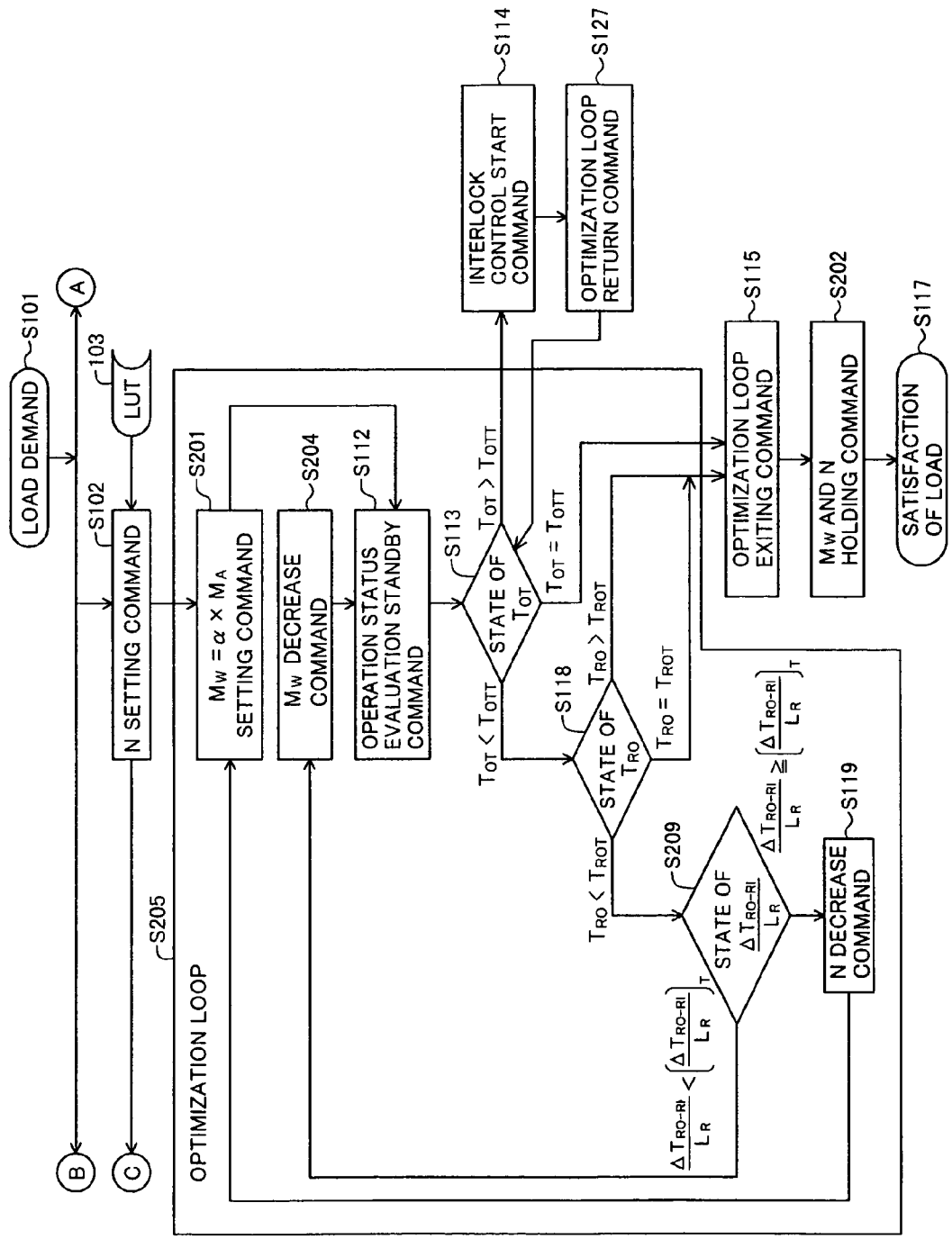
FIG. 11 is a flowchart showing a method of operating a gas turbine power generator according to a third embodiment of the present invention.

The following description is therefore made of a method of operating the gas turbine power generator according to this embodiment with reference to FIG. 11.

FIG. 11 is a flowchart showing the method of operating the gas turbine power generator according to the third embodiment of the present invention. In control flows shown in the flowchart, (A) in FIG. 11 continues to (A) in FIG. 3 and (B), (C) in FIG. 11 continue respectively to (B), (C) in FIG. 4. Additionally, the same step numbers as those in FIG. 10 represent the same control procedures.

Since basic control procedures of the operating method are the same as those shown in FIG. 10, a description is made primarily of different points in comparison with FIG. 10. In this embodiment, processing of step s212 is executed instead of step s209 shown in FIG. 10.

In step s212, the control unit 100 compares a regenerative heat exchanger temperature gradient $\Delta T_{RO-RI/LR}$, which is resulted from dividing a temperature difference $\Delta T_{RO-RI}$ between the inlet and the outlet of the regenerative heat exchanger 4 by a flow passage length $L_R$ inside the regenerative heat exchanger, with a reference temperature gradient $(\Delta T_{RO-RI/LR})T$ in the regenerative heat exchanger.

As a result of comparing the regenerative heat exchanger temperature gradient $\Delta T_{RO-RI/LR}$ with the reference temperature gradient $(\Delta T_{RO-RI/LR})T$, if the regenerative heat exchanger temperature $\Delta T_{RO-RI/LR}$ is lower than the reference temperature gradient $(\Delta T_{RO-RI/LR})T$ $((\Delta T_{RO-RI/LR}) < (\Delta T_{RO-RI/LR})T))$ the control unit 100 issues, in step s204, the command for decreasing the flow rate Mw of the humidifying water.

If the regenerative heat exchanger temperature gradient $\Delta T_{RO-RI/LR}$ is not lower than the reference temperature gradient $(\Delta T_{RO-RI/LR})T$ $((\Delta T_{RO-RI/LR}) \geq ((\Delta T_{RO-RI/LR})T))$, the control unit 100 issues, in step s119, the command for decreasing the number of rotations N.

Here, the regenerative heat exchanger temperature gradient $\Delta T_{RO-RI/LR}$ is decided from measured values of the inlet and outlet temperatures of the regenerative heat exchanger 4, and the reference temperature gradient $(\Delta T_{RO-RI/LR})T$ is decided based on a thermal balance calculation. As an alternative, values of the reference temperature gradient $(\Delta T_{RO-RI/LR})T$ with respect to pressure and temperature at the inlet of the regenerative heat exchanger over necessary ranges may be stored as memory data in a lookup table beforehand. Further, instead of measuring the pressure and temperature at the inlet of the regenerative heat exchanger, the pressure and temperature at the inlet of the regenerative heat exchanger may be calculated by measuring the intake-air flow rate and the pressure and temperature at the inlet of the compressor, and determining the compressor efficiency and compression ratio from a measured value of the number of rotations N and a performance curve approximation formula for the compressor.

Figure 12:
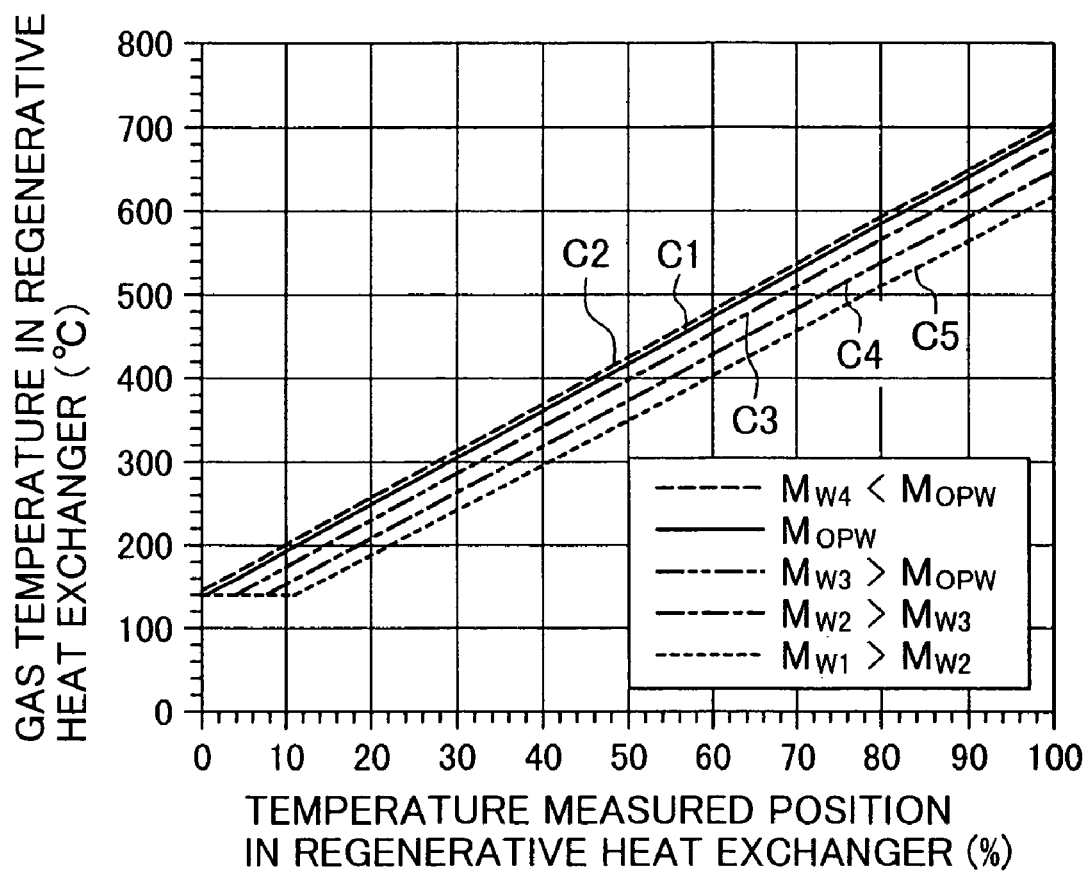
FIG. 12 is an explanatory graph showing a temperature distribution in a regenerative heat exchanger resulting when a flow rate Mw of humidifying water is changed in five ways in the gas turbine power generator according to the third embodiment of the present invention.
Figure 13:
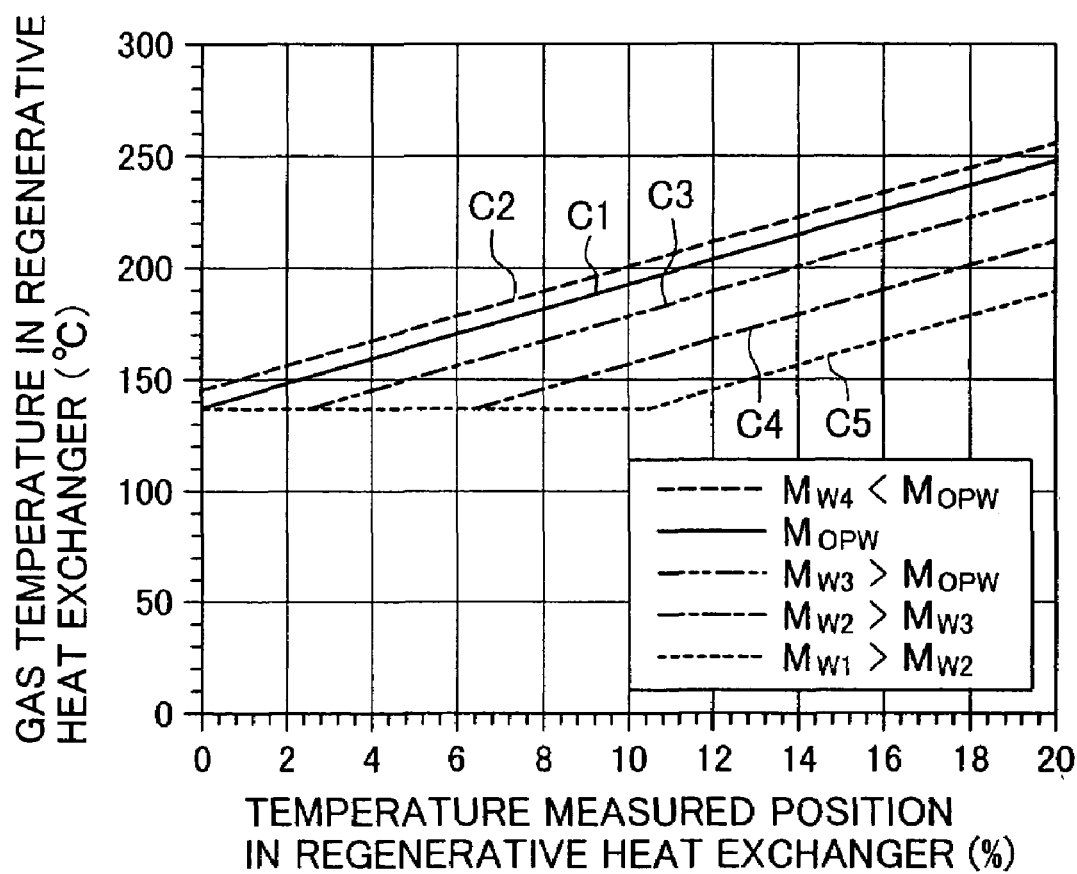
FIG. 13 is an enlarged graph of a portion of FIG. 12.

With reference to FIGS. 12 and 13, a description is now made of a temperature distribution in the regenerative heat exchanger resulting when the flow rate Mw of the humidifying water is changed in five ways in the gas turbine power generator according to this embodiment.

FIG. 12 is an explanatory graph showing a temperature distribution in the regenerative heat exchanger resulting when the flow rate Mw of the humidifying water is changed in five ways in the gas turbine power generator according to the third embodiment of the present invention, and FIG. 13 is an enlarged graph of a portion of FIG. 12. In FIG. 12, the vertical axis represents the temperature in the regenerative heat exchanger, and the horizontal axis represents the position in the regenerative heat exchanger, at which the temperature is measured, after normalization with the flow passage length in the regenerative heat exchanger set to 100%.

A solid line C1 indicates the case of humidifying the intake air just at the optimum flow rate MOpw of the humidifying water. A broken line C2 indicates the case of humidifying the intake air at the flow rate Mw4 of the humidifying water smaller than the optimum flow rate MOpw. A two-dot-chain line C3, a one-dot-chain line C4 and a dotted line C5 indicate respectively the cases of humidifying the intake air at the flow rates Mw3, Mw2 and Mw1 of the humidifying water larger than the optimum flow rate MOpw. Those flow rates of the humidifying water meet a condition of Mw4<MOpw<Mw1<Mw2<Mw3.

In the case of humidifying the intake air at the flow rate smaller than the optimum flow rate MOpw of the humidifying water (broken line C2), the regenerative heat exchanger temperature gradient $\Delta T_{RO-RI/LR}$ is larger than in the case of humidifying the intake air just at the optimum flow rate MOpw of the humidifying water (solid line C1).

Further, as is apparent from FIG. 11 showing, in enlarged scale, a portion in which the temperature measured position in the regenerative heat exchanger ranges from 0 to 20%, the cases (two-dot-chain line C3, one-dot-chain line C4 and dotted line C5) of humidifying the intake air at the flow rates larger than the optimum flow rate MOpw of the humidifying water include a zone in which an effective temperature rise is not obtained until droplets of the humidifying water evaporate. In the cases of humidifying the intake air at the flow rates larger than the optimum flow rate MOpw of the humidifying water, therefore, the regenerative heat exchanger temperature gradient $\Delta T_{RO-RI/LR}$ is reduced.

Additionally, as is apparent from FIGS. 12 and 13, while the regenerative heat exchanger temperature gradient $\Delta T_{RO-RI/LR}$ is used in this embodiment for deciding the optimum flow rate of the humidifying water, a temperature gradient in a region the effective temperature rise in the regenerative heat exchanger changes may be used instead.

With this embodiment, as described above, it is possible to increase the power generation efficiency in the partial load operation, and to decrease a variation in the number of rotations caused by a variation in the power generation load. Further, an optimum regenerative heat exchanger temperature gradient can be obtained by adjusting the flow rate Mw of the humidifying water based on the regenerative heat exchanger temperature gradient $\Delta T_{RO-RI/LR}$.

Next, the construction and operation of a gas turbine power generator according to a fourth embodiment of the present invention will be described below with reference to FIG. 14.

Figure 14:
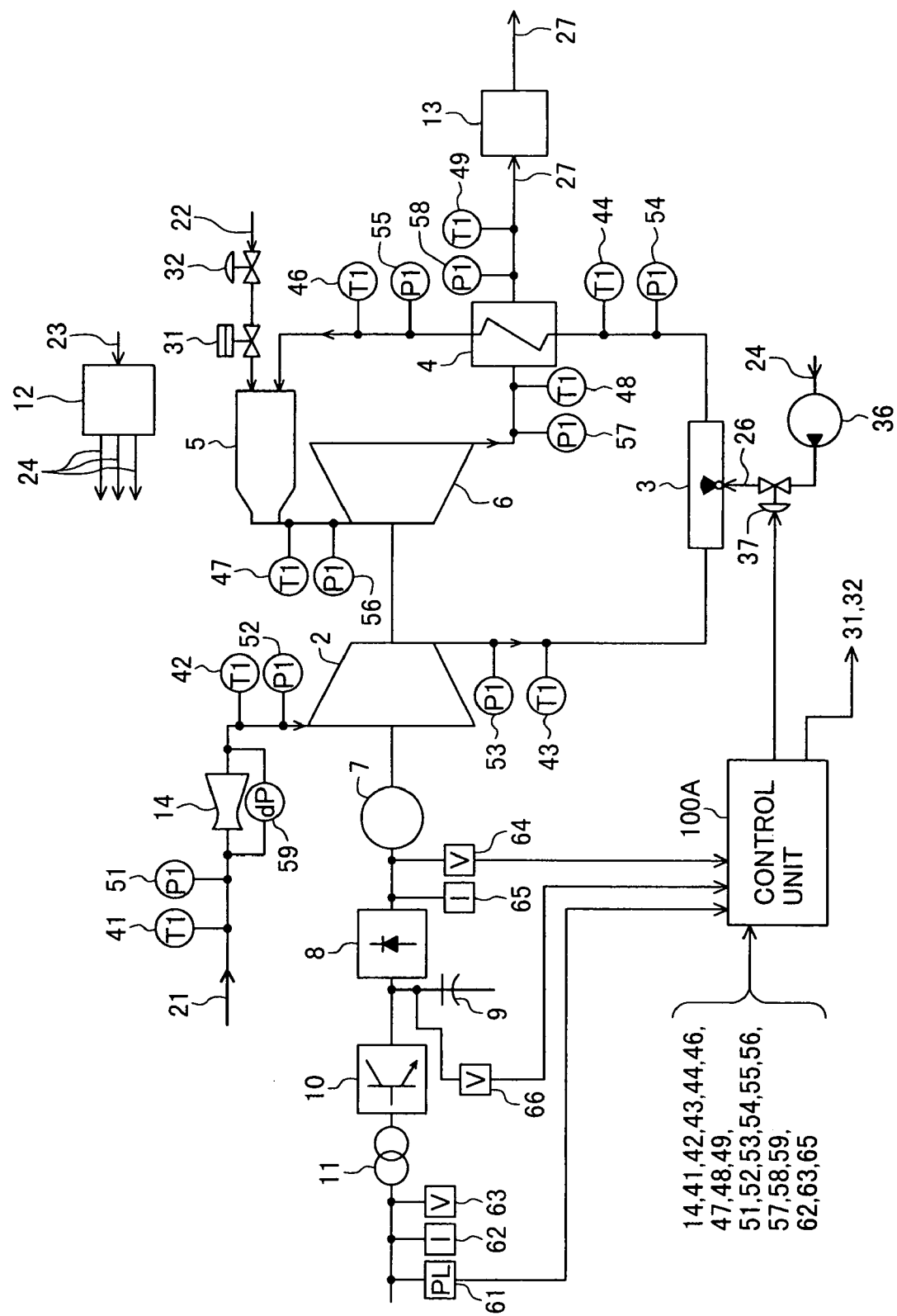
FIG. 14 is a system diagram showing an overall construction of a gas turbine power generator according to a fourth embodiment of the present invention.

FIG. 14 is a system diagram showing an overall construction of the gas turbine power generator according to the fourth embodiment of the present invention. Note that the same characters as those in FIG. 1 denote the same components.

This embodiment includes neither the intake-air sprayer 1 nor the associated accessory equipment, which are provided in the gas turbine power generator shown in FIG. 1. The other construction is the same as that shown in FIG. 1. Also, a control unit 100A executes operation control in the same manner as that shown in FIGS. 2 to 4. However, the flow rate Mw of the humidifying water is controlled only by the humidifier 3. Alternatively, the operation control may be executed using the same manner as that shown in FIG. 10 or 11.

This embodiment is applicable to, for example, a district where a variation in temperature of open air is small or a district where an annual highest atmospheric temperature is relatively low, and humidifies the intake-air by the humidifier 3 alone without employing the intake-air sprayer 1. Because moisture tends to more easily saturate at the inlet of the compressor 2, the outlet temperature of the compressor 2 is reduced by humidifying the intake-air with the humidifier 3 so that easier humidification is realized and the power generation efficiency is increased.

With this embodiment, as described above, it is possible to increase the power generation efficiency in the partial load operation, and to decrease a variation in the number of rotations caused by a variation in the power generation load.

Next, the construction and operation of a gas turbine power generator according to a fifth embodiment of the present invention will be described below with reference to FIG. 15.

Figure 15:
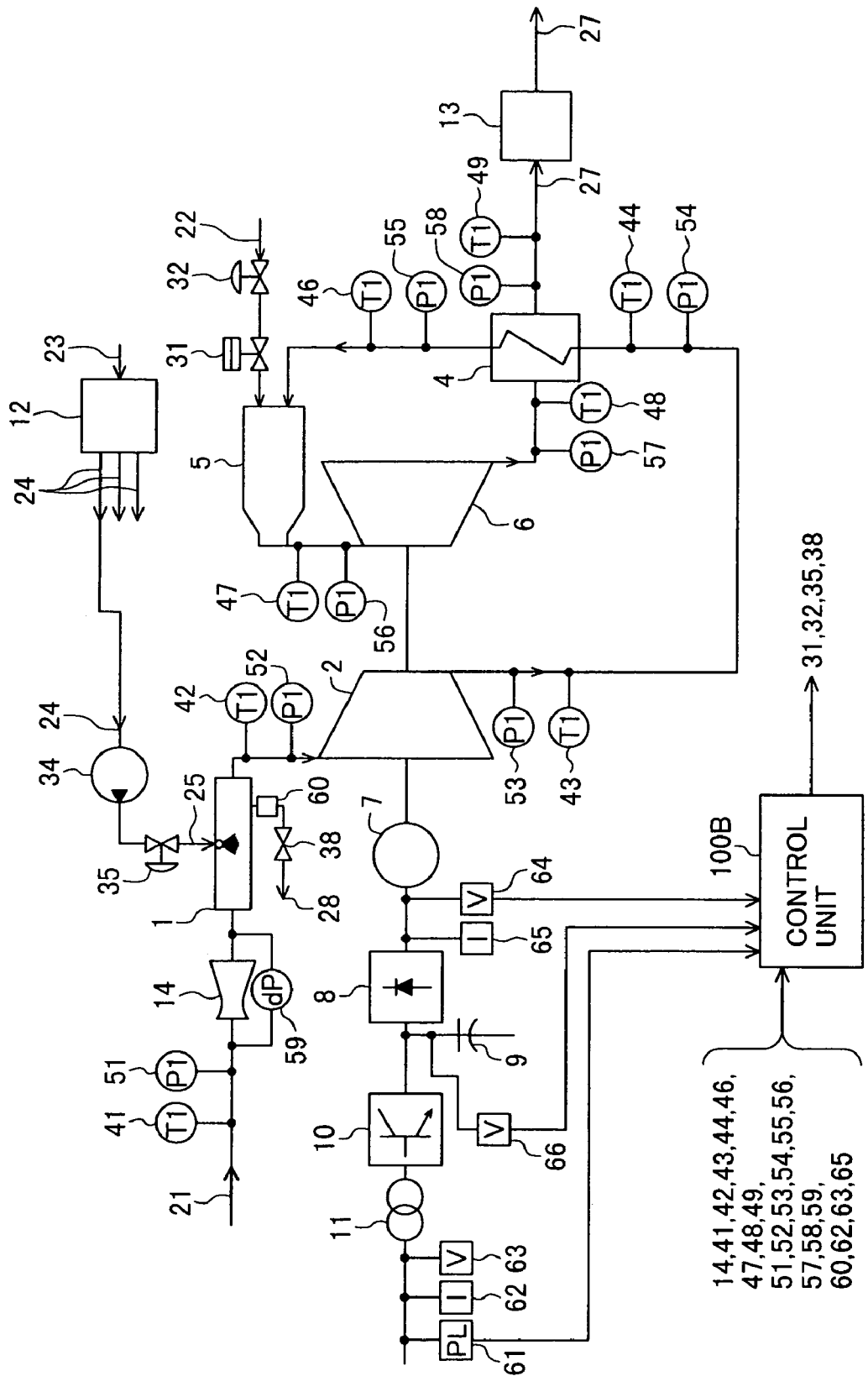
FIG. 15 is a system diagram showing an overall construction of a gas turbine power generator according to a fifth embodiment of the present invention.

FIG. 15 is a system diagram showing an overall construction of the gas turbine power generator according to the fifth embodiment of the present invention. Note that the same characters as those in FIG. 1 denote the same components.

This embodiment includes neither the humidifier 3 nor the associated accessory equipment, which are provided in the gas turbine power generator shown in FIG. 1. The other construction is the same as that shown in FIG. 1. Also, a control unit 100B executes operation control in the same manner as that shown in FIGS. 2 to 4. However, the flow rate Mw of the humidifying water is controlled only by the intake-air sprayer 1. Alternatively, the operation control may be executed using the same manner as that shown in FIG. 10 or 11. Because the temperature of the intake-air flowing into the compressor 2 can be reduced by humidifying the intake-air with the intake-air sprayer 1, the compression efficiency of the compressor 2 is increased and so is the amount of air supplied to the turbine 6. As a result, the generator output can be increased.

With this embodiment, as described above, it is possible to increase the power generation efficiency in the partial load operation, and to decrease a variation in the number of rotations caused by a variation in the power generation load.

Next, the construction and operation of a gas turbine power generator according to a sixth embodiment of the present invention will be described below with reference to FIGS. 16 and 17.

Figure 16:
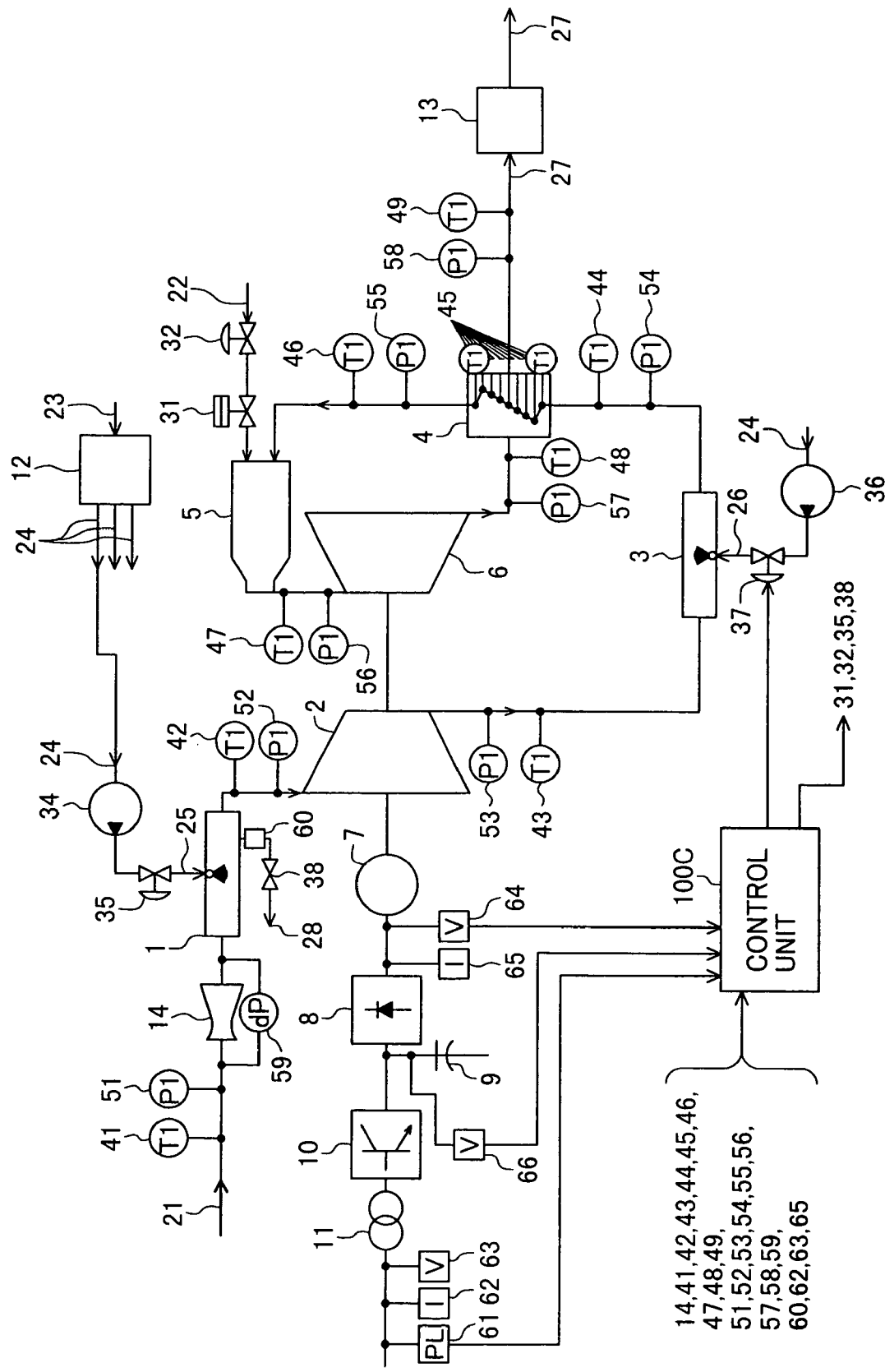
FIG. 16 is a system diagram showing an overall construction of a gas turbine power generator according to a sixth embodiment of the present invention.

FIG. 16 is a system diagram showing an overall construction of the gas turbine power generator according to the sixth embodiment of the present invention. Note that the same characters as those in FIG. 1 denote the same components.

This embodiment includes a regenerative-heat-exchanger inner temperature measuring means 45 capable of measuring temperatures inside the regenerative heat exchanger 4 at multiple points.

A method of operating the gas turbine power generator according to this embodiment will be described below with reference to FIG. 17.

Figure 17:
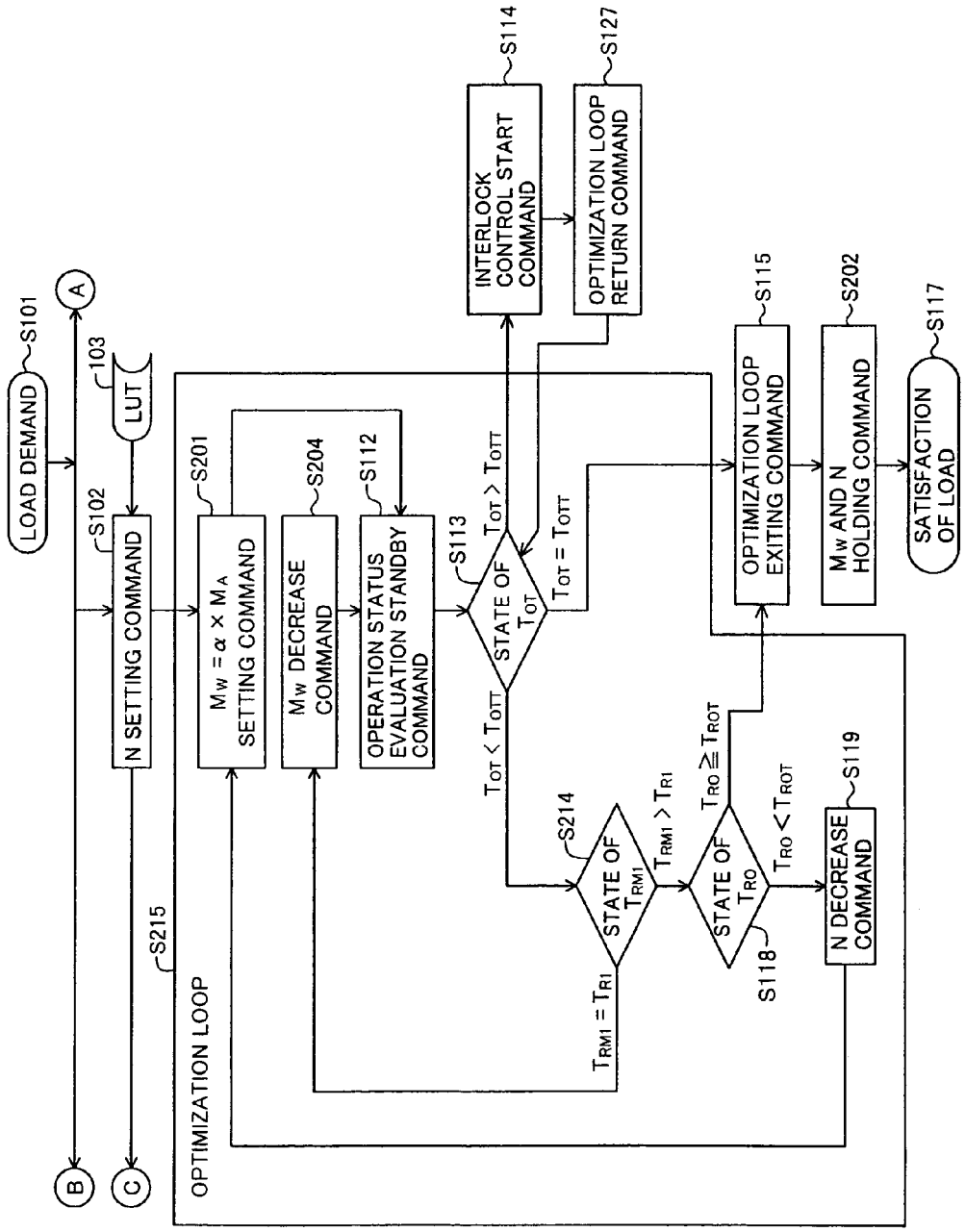
FIG. 17 is a flowchart showing a method of operating the gas turbine power generator according to the sixth embodiment of the present invention.

FIG. 17 is a flowchart showing the method of operating the gas turbine power generator according to the sixth embodiment of the present invention. In control flows shown in the flowchart, (A) in FIG. 17 continues to (A) in FIG. 3 and (B), (C) in FIG. 17 continue respectively to (B), (C) in FIG. 4. Additionally, the same step numbers as those in FIG. 2 represent the same control procedures.

Since basic control procedures of the operating method are the same as those shown in FIG. 2, a description is made primarily of different points in comparison with FIG. 2. In this embodiment, processing of step s214 is executed instead of step s118 shown in FIG. 2, and processing of step s118 is executed instead of step s203 shown in FIG. 2.

If the turbine outlet temperature $T_{OT}$ is lower than the turbine outlet setting temperature $T_{OTT}$, a control unit 100C compares a temperature $T_{RM1}$ inside the regenerative heat exchanger at a position closest to the inlet with the regenerative heat exchanger inlet temperature $T_{RI}$ in step s214.

As a result of the comparison, if the temperature $T_{RM1}$ inside the regenerative heat exchanger at the position closest to the inlet is equal to the regenerative heat exchanger inlet temperature $T_{RI}$ ($T_{RM1}=T_{RI}$), the control unit 100C issues the command for decreasing the flow rate Mw of the humidifying water in step s204.

If the temperature $T_{RM1}$ inside the regenerative heat exchanger at the position closest to the inlet is higher than the regenerative heat exchanger inlet temperature $T_{RI}$ ($T_{RM1}>T_{RI}$), the control unit 100C compares the regenerative heat exchanger outlet temperature $T_{RO}$ with the regenerative-heat-exchanger inlet setting temperature $T_{ROT}$ in step s118.

As a result of comparing the regenerative heat exchanger outlet temperature $T_{RO}$ with the regenerative-heat-exchanger outlet setting temperature $T_{ROT}$, if the regenerative heat exchanger outlet temperature $T_{RO}$ is not lower than the regenerative-heat-exchanger inlet setting temperature $T_{ROT}$ ($T_{RO} \geq T_{ROT}$), the control unit 100C issues the command for exiting the optimization loop in step s115. Then, in step s202, the control unit 100C issues the command for holding the flow rate Mw of the humidifying water and the number of rotations N at the same values as those set at that time.

If the regenerative heat exchanger outlet temperature $T_{RO}$ is lower than the regenerative-heat-exchanger inlet setting temperature $T_{ROT}$ in ($T_{RO}<T_{ROT}$), the control unit 100C issues the command for decreasing the number of rotations N in step s119.

With this embodiment, as described above, it is possible to increase the power generation efficiency in the partial load operation, and to decrease a variation in the number of rotations caused by a variation in the power generation load.

In each of the embodiments described above, since cooled water is supplied to the intake-air sprayer 1 through the intake-air cooling water ejection pump 34 and the intake-air is humidified and cooled with the intake-air spraying water 25, the power required for the compressor can be reduced and the power generation terminal output and the power generation efficiency can be increased.

Even with a very small flow rate of about 0.01 weight percent of the air mass flow rate, the intake-air spraying water 25 is effective in reducing the compressor power through change in the specific heat ratio resulting from the humidification. In order to positively evaporate the intake-air spraying water and quickly humidify the intake air, however, a flow rate of about 0.4 weight percent of the air mass flow rate is appropriate. In this respect, among droplets of the intake-air spraying water which did not evaporate, large-sized droplets are discharged and recovered as the drained water 28, while small-sized droplets are delivered from the compressor together with the intake air and then evaporate on the delivery side of the compressor, thereby developing a similar effect to that obtainable with the case of slightly humidifying the intake air by the humidifier 3.

When carrying out spray cooling of the intake air, therefore, the flow rate set in step s201 by multiplying the air flow rate $M_A$ by the constant $\alpha$ is set to a value that is resulted from reducing the amount of the drained water per unit time from the flow rate of the intake-air spraying water.

INDUSTRIAL APPLICABILITY

According to the present invention, it is possible to increase the power generation efficiency in the partial load operation, and to decrease a variation in the number of rotations caused by a variation in the power generation load.

What is claimed is:

1. A gas turbine power generator comprising:
   a compressor for compressing air;
   a combustor for burning the compressed air and fuel;
   a turbine driven by combustion gas produced in said combustor and driving said compressor and a generator;
   a regenerative heat exchanger for exchanging heat between exhaust gas from said turbine and the compressed air led into said combustor;
   humidifying and cooling means for humidifying and cooling intake air flown into said regenerative heat exchanger, and
   control means for controlling a flow rate of humidifying water supplied by said humidifying and cooling means to a value required for making an intake air temperature at an inlet of said regenerative heat exchanger coincident with a saturation water vapor temperature.

2. A gas turbine power generator according to claim 1, wherein said humidifying and cooling means is an intake air sprayer for spraying water to the intake air at an inlet of said compressor, thereby humidifying and cooling the intake air led into said compressor.

3. A gas turbine power generator according to claim 1, wherein said humidifying and cooling means is a humidifier for spraying water to air compressed by said compressor.

4. A gas turbine power generator according to claim 1, wherein said control means controls the number of rotations of said turbine and a flow rate of fuel supplied to said combustor.

5. A gas turbine power generator according to claim 4, wherein said control means controls the flow rate of the humidifying water to be coincident with an optimum flow rate of the humidifying water as far as possible, thereby reducing the number of times at which the number of rotations is adjusted.

6. A gas turbine power generator according to claim 5, wherein said control means decides the optimum flow rate (MOPW) of the humidifying water by comparing a temperature gradient, which is resulted from dividing a temperature difference between an inlet and an outlet of said regenerative heat exchanger by a flow passage length inside said regenerative heat exchanger, with a target temperature gradient in said regenerative heat exchanger.

7. A gas turbine power generator according to claim 4, wherein said control means makes control, after setting the flow rate of the humidifying water on the delivery side of said compressor to a maximum setting flow rate, to gradually reduce the flow rate of the humidifying water to an optimum flow rate of the humidifying water while confirming that an outlet temperature of said regenerative heat exchanger and an inlet or outlet temperature of said turbine are lower than respective setting temperatures.

8. A gas turbine power generator according to claim 7, wherein said control means decides the optimum flow rate (MOPW) of the humidifying water by measuring a pressure and temperature at an inlet of said regenerative heat exchanger, and employing a saturation temperature formula.

9. A gas turbine power generator according to claim 7, wherein said control means decides the optimum flow rate (MOPW) of the humidifying water by comparing the specific heat of the intake air at an inlet of said regenerative heat exchanger with the specific heat of the intake air in a saturation state.

10. A gas turbine power generator according to claim 7, wherein said control means decides the optimum flow rate (MOPW) of the humidifying water by measuring an inlet temperature said regenerative heat exchanger and an air temperature inside said regenerative heat exchanger.

11. A gas turbine power generator according to claim 4, wherein when an inlet temperature or an outlet temperature of said turbine rises excessively, said control means increases the flow rate of the humidifying water to lower the inlet temperature or the outlet temperature of said turbine for return to a safe operation state.

12. A gas turbine power generator according to claim 4, wherein when decreasing the flow rate Mw of the humidifying water on the delivery side of said compressor, said control means sets a decrease amount of the humidifying water to the least possible value within the flow rate adjustable range.

13. A gas turbine power generator according to claim 4, wherein said control means issues an alarm when temperatures of said combustor and said turbine exceeds alarm setting temperatures, and sets the alarm setting temperatures to higher values depending on a rise of the open air temperature.

* * * * *